US011875649B2

(12) United States Patent
Flaherty

(10) Patent No.: US 11,875,649 B2
(45) Date of Patent: *Jan. 16, 2024

(54) CARD GAME WITH RAKE

(71) Applicant: CFPH, LLC, New York, NY (US)

(72) Inventor: Phillip Flaherty, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 163 days.

This patent is subject to a terminal disclaimer.

(21) Appl. No.: 17/485,655

(22) Filed: Sep. 27, 2021

(65) Prior Publication Data

US 2022/0012987 A1 Jan. 13, 2022

Related U.S. Application Data

(63) Continuation of application No. 16/742,834, filed on Jan. 14, 2020, now Pat. No. 11,132,874, which is a continuation of application No. 13/939,428, filed on Jul. 11, 2013, now Pat. No. 10,565,827.

(60) Provisional application No. 61/715,983, filed on Oct. 19, 2012, provisional application No. 61/670,763, filed on Jul. 12, 2012.

(51) Int. Cl.

| | |
|---|---|
| ***G07F 17/32*** | (2006.01) |
| ***A63F 1/00*** | (2006.01) |
| ***A63F 3/00*** | (2006.01) |

(52) U.S. Cl.

CPC ...... *G07F 17/3293* (2013.01); *G07F 17/3276* (2013.01); *A63F 3/00157* (2013.01); *A63F 2001/005* (2013.01); *A63F 2001/008* (2013.01); *A63F 2003/00164* (2013.01); *G07F 17/32* (2013.01); *G07F 17/322* (2013.01); *G07F 17/3272* (2013.01)

(58) Field of Classification Search

None

See application file for complete search history.

(56) References Cited

U.S. PATENT DOCUMENTS

| | | | | |
|---|---|---|---|---|
| 10,147,279 | B2 * | 12/2018 | Chun | G07F 17/3258 |
| 2008/0071356 | A1 * | 3/2008 | Greenhalgh | A61F 2/91 606/53 |
| 2009/0305761 | A1 * | 12/2009 | Jackson | G07F 17/3293 463/12 |
| 2017/0193754 | A1 * | 7/2017 | Ryu | A63F 3/00157 |

* cited by examiner

*Primary Examiner* — Ronald Laneau

(57) ABSTRACT

Some embodiments may relate to a game in which a house takes a rake as a fee for playing a game. A game may include a multiplayer baccarat game that may add a skill element. For example, a baccarat game may add the ability for player's to bluff, choose whether to request cards, raise, fold, and so on. Other example methods and apparatus are described. Some embodiments may include a rake version of Chinese poker. Some embodiments include an open face version of a card game. Some embodiments include a card game with a virtual player position that allows users to play in the virtual player position.

9 Claims, 5 Drawing Sheets

CARD GAME WITH RAKE

CROSS REFERENCE TO RELATED APPLICATIONS

This application is a continuation of U.S. patent application Ser. No. 16/742,834 filed on Jan. 14, 2020 which is a continuation of U.S. patent application Ser. No. 13/939,428 filed on Jul. 11, 2013 (now U.S. Pat. No. 10,565,827 issued Feb. 18, 2020) which claims priority to U.S. Provisional Application No. 61/670,763 filed Jul. 12, 2012 and U.S. Provisional Application No. 61/715,983 filed Oct. 19, 2012, which are hereby incorporated herein by reference.

FIELD

Some embodiments may relate to card games, casino wagering, games of any type, and so on.

BACKGROUND

Traditional wagering may involve risking an amount of money for the potential of winning a greater amount of money. The outcome of a wager may be based on events in a card game and/or other type of game.

SUMMARY

Figure 1:
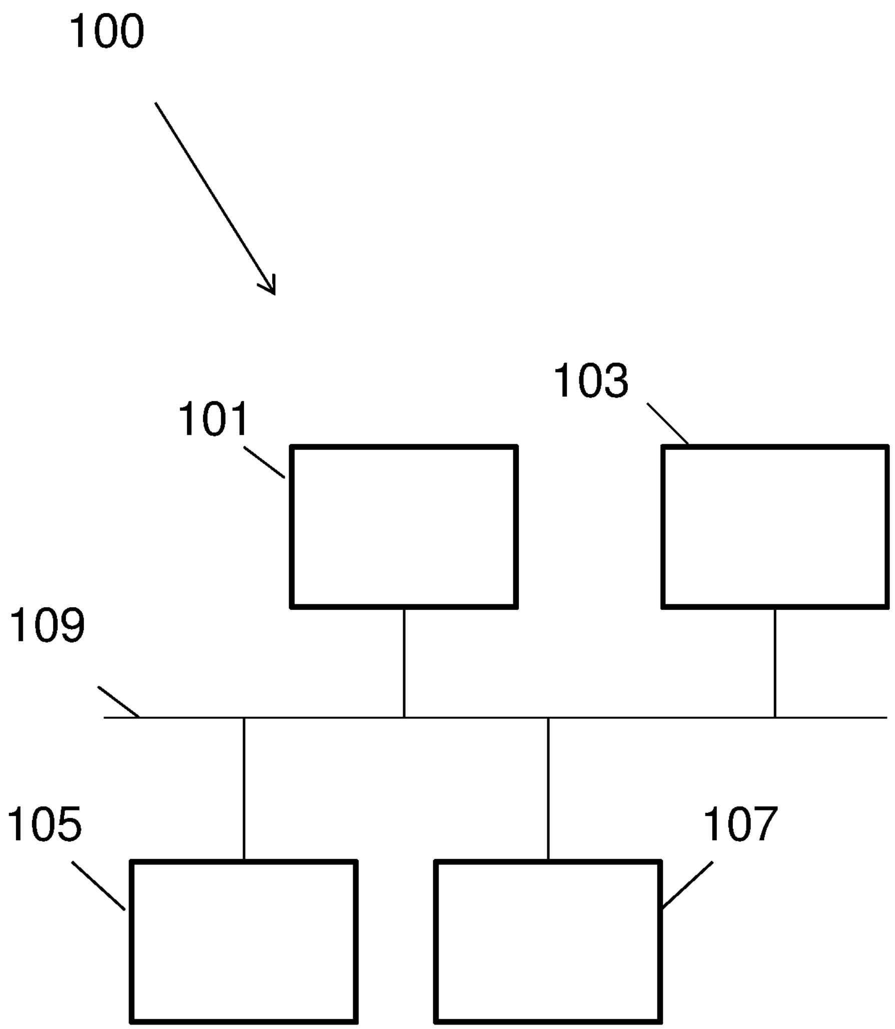
FIG. 1 shows an example system that may be used in some embodiments.

The following should be understood to be embodiments, not claims.

A. An Apparatus Comprising:

a non-transitory machine readable medium having stored thereon a plurality of instructions that when executed by a computing device cause the computing device to:

receive a respective ante for a baccarat game from each of a first player and a second player;

in response to receiving the antes, provide a first initial set of two cards to a first player in a baccarat game, in which the first player controls the hand of the player in the baccarat game;

in response to receiving the antes, provide a second initial set of two cards to a second player in the baccarat game, in which the second player controls the hand of the banker in the baccarat game, in which the first initial set of two cards are provided such that the second player cannot view the first initial set of two cards and in which the second initial set of two cards are provided such that the first player cannot view the second initial set of two cards;

after providing the first initial set and the second initial set, receive a raise of an amount of money by the first player;

in response to receiving the raise, allow the second player to choose a first action from a group of actions consisting of: re-raise, call, and fold;

after allowing the second player to choose the first action, allow the first player to choose whether or not to request a first additional card in the baccarat game;

in response to the first player requesting the first additional card, provide the first player with the first additional card, in which the first additional card is provided such that both the first and second players can view the first additional card, and in which the first initial set of two cards together with the first additional card form a first final hand in the baccarat game;

after allowing the first player to choose whether or not to request the first additional card, allow the second player to choose whether or not to request a second additional card in the baccarat game;

in response to the second player requesting the second additional card, provide the second player with the second additional card, in which the second additional card is provided such that both the first and second players can view the second additional card, and in which the second initial set of two cards together with at least the second additional card form a second final hand in the baccarat game; and determine a winner of the baccarat game based on a comparison of baccarat scores of each of the first final hand and the second final hand.

A.1. The apparatus of claim A, in which the instructions cause the computing device to:

after providing the second player with the second additional card, receive a second raise of a second amount of money by the second player; and in response to receiving the second raise, allow the first player to choose a second action from the group of actions consisting of: re-raise, call, and fold.

A.1.1. The apparatus of claim A.1, in which the instructions cause the computing device to:

after providing the first player with the first additional card and prior to allowing the second player to choose whether or not to request the second additional card, receive a third raise of a third amount of money by the first player; and in response to receiving the third raise, allow the second player to choose a third action from the group of actions consisting of: re-raise, call, and fold.

A.2. The apparatus of claim A, in which at least one of the first initial set of two cards and the second initial set of two cards has a baccarat value of 8 or 9.

A.3. The apparatus of claim A, in which the instructions cause the computing device to:

allow the first player to choose from a plurality of side bets that are each based on a sub portion of the baccarat game;

in response to the first player choosing a side bet of the plurality of side bets, determining whether the second player has sufficient money in a wagering account to enter into the account, in which sufficient money includes money that the second player would need to pay if the second player loses the side bet; and in response to the second player having sufficient money, automatically forming the side bet between the first player and the second player, in which the first player is given the choice based on the first player being in the player position in the baccarat game.

A.3.1. The apparatus of claim A.3, in which the side bet includes a side bet made after the first and second initial set of two cards are provided.

A.3.2. The apparatus of claim A.3, in which the side bet includes a side be made before the first and second initial set of two cards are provided.

A.4. The apparatus of claim A, in which the plurality of instructions cause the computing device to:

provide observers of the first baccarat game with an opportunity to enter into a side bet based on a subpart of the baccarat game.

A.5. The apparatus of claim A, in which the instructions cause the computing device to:

provide a third initial set of two cards to the first player in a second baccarat game, in which the first player controls the hand of the banker in the second baccarat game;

provide a fourth initial set of two cads to the second player in the second baccarat game, in which the second player controls the hand of the player in the second baccarat game;

determine that at least one of the third initial set of two cards and the fourth initial set of two cards has a baccarat score or 8 or 9; and in response to that determination, end the second baccarat game without allowing either the first player or the second player to request additional cards for the second baccarat game.

A.6. The apparatus of claim A, in which plurality of instructions cause at least one of the first and the second players to be provided further additional cards.

A.6.1. The apparatus of claim A.6, in which the at least one of the first and second players is provided with the opportunity to accept the further additional cards until a summed numerical value of the hand equals 8 or greater when all cards are given their face value including face cards being worth ten and aces being worth one.

B. A Method Comprising:

receiving, by a computing device, a respective ante for a baccarat game from each of a first player and a second player;

in response to receiving the antes, providing, by the computing device, a first initial set of two cards to a first player in a baccarat game, in which the first player controls the hand of the player in the baccarat game;

in response to receiving the antes, providing, by the computing device, a second initial set of two cards to a second player in the baccarat game, in which the second player controls the hand of the banker in the baccarat game, in which the first initial set of two cards are provided such that the second player cannot view the first initial set of two cards and in which the second initial set of two cards are provided such that the first player cannot view the second initial set of two cards;

after providing the first initial set and the second initial set, receiving, by the computing device, a raise of an amount of money by the first player;

in response to receiving the raise, allowing, by the computing device, the second player to choose a first action from a group of actions consisting of: re-raise, call, and fold;

after allowing the second player to choose the first action, allowing, by the computing device, the first player to choose whether or not to request a first additional card in the baccarat game;

in response to the first player requesting the first additional card, providing, by the computing device, the first player with the first additional card, in which the first additional card is provided such that both the first and second players can view the first additional card, and in which the first initial set of two cards together with the first additional card form a first final hand in the baccarat game;

after allowing the first player to choose whether or not to request the first additional card, allowing, by the computing device, the second player to choose whether or not to request a second additional card in the baccarat game;

in response to the second player requesting the second additional card, providing, by the computing device, the second player with the second additional card, in which the second additional card is provided such that both the first and second players can view the second additional card, and in which the second initial set of two cards together with at least the second additional card form a second final hand in the baccarat game; and determining, by the computing device, a winner of the baccarat game based on a comparison of baccarat scores of each of the first final hand and the second final hand.

C. An Apparatus Comprising:

a processor; and a non-transitory medium having stored thereon a plurality of instructions that when executed cause the apparatus to:

determine a plurality of players for a game of Chinese poker;

providing a respective first interval of cards to each player of the plurality of players;

facilitate a first round of betting in the game of Chinese poker after providing the respective first intervals;

providing a respective second interval of cards to each player of the plurality of players that remains in the game of Chinese poker after the first round of betting;

facilitating a second round of betting in the game of Chinese poker after providing the respective second intervals;

providing a respective final interval of cards to each player of the plurality of players that remains in the game of Chinese poker after the second round of betting;

facilitating a final round of betting in the game of Chinese poker after providing the respective final intervals;

requiring each player of the plurality of players that remains in the game of Chinese poker after the final round of betting to set a respective group of three hands for the game of Chinese poker;

revealing the respective groups of hands to each player of the plurality of players that remains in the game of Chinese poker after the final round of betting;

scoring the hands of Chinese poker according to rules of Chinese poker by comparing the respective groups of hands of players with one another; and adjusting account balances of the players based on the scoring and the rounds of betting.

C.1. The apparatus of claim C, in which facilitating the first round of betting includes allowing at least one of the plurality of players to propose a raise in an amount of money that each point in Chinese poker is worth between that at least one player and at least one other player of the plurality of players.

C.1.1. The apparatus of claim C.1, in which facilitating the first round of betting includes allowing the at least one of the plurality of players to propose a raise of a different amount of money that each point in Chinese poker is worth between that at least one player and at least one different player than the at least one other player of the plurality of players.

C.2. The apparatus of claim C, in which facilitating the first round of betting includes allowing the at least one other player to respond to the proposed raise by at least one of calling, reraising, folding, and freezing an amount that points are worth between the at least one player and the at least one other player for the rest of the game of Chinese poker.

C.2.1. The apparatus of claim C.2, in which the amount that points are worth include at least one of an amount proposed and an amount that they were before the amount proposed.

C.3. The apparatus of claim C, in which adjusting account balances includes adjusting accounts in accordance with various point worths between each player of the plurality of players that are set based on the rounds of betting such that different players have different point worths against one another.

C.4. The apparatus of claim C, in which each group of hands includes three hands with five, five, and three cards respectively, and in which the hands within each group of hands must be arranged such that the first hand has a highest rank, the second hand has a next highest rank and the third hand has a lowest rank in order to score points in the game of Chinese poker.

D. An apparatus comprising:

a processor; and a non-transitory medium having stored thereon a plurality of instructions that when executed cause the apparatus to:

determine a plurality of players for a game of Chinese poker;

providing a respective first interval of cards to each player of the plurality of players;

facilitate a first round of betting in the game of Chinese poker after providing the respective first intervals;

requiring each player of the plurality of players that remains in the game of Chinese poker after the first round of betting to set a respective group of three hands for the game of Chinese poker with the respective first interval of cards;

revealing the respective groups of hands to each player of the plurality of players that remains in the game of Chinese poker after the first round of betting;

providing a respective second interval of cards to each player of the plurality of players that remains in the game of Chinese poker after the first round of betting;

facilitating a second round of betting in the game of Chinese poker after providing the respective second intervals;

requiring each player of the plurality of players that remains in the game of Chinese poker after the second round of betting to set the respective group of three hands for the game of Chinese poker with the respective second interval of cards;

revealing the respective groups of hands to each player of the plurality of players that remains in the game of Chinese poker after the second round of betting;

providing a respective final interval of cards to each player of the plurality of players that remains in the game of Chinese poker after the second round of betting;

facilitating a final round of betting in the game of Chinese poker after providing the respective final intervals;

requiring each player of the plurality of players that remains in the game of Chinese poker after the final round of betting to set a respective group of three hands for the game of Chinese poker with the respective final interval of cards;

revealing the respective groups hands to each player of the plurality of players that remains in the game of Chinese poker after the final round of betting;

scoring the hands of Chinese poker according to rules of Chinese poker by comparing the respective groups of hands of players with one another; and adjusting account balances of the players based on the scoring and the rounds of betting.

D.1. The apparatus of claim D, in which setting a group of hands with an interval of cards includes placing cards in one of three hands such that they remain in that hand for the rest of the game of Chinese poker.

E. An apparatus comprising:

a processor; and a non-transitory medium having stored thereon a plurality of instructions that when executed cause the apparatus to:

determining a set of primary players for a game;

determining a set of users for a virtual player in the game;

determining a respective set of cards for each of the primary players for the game;

determining a second set of cards for the virtual player in the game;

receiving a respective choice from each of the primary players in the game regarding play of the game using a respective set of cards;

receiving a respective second choice from each of the set of users regarding play of the game using the second set of cards;

scoring the game based on the respective sets of cards, the second set of cards, the respective choices, and the respective second choices; and adjusting account balances of the players based on the scoring.

E.1. The apparatus of claim E, in which the respective choice from each of the primary players includes a choice on how to set cards in a game of Chinese poker.

E.2. The apparatus of claim E, in which receiving the respective second choice from each of the set of users includes a choice on how to set the second set of cards in a game of Chinese poker;

E.2.1. The apparatus of claim E.2, in which scoring the game includes comparing the second set of cards set according to each respective second choice to each of the respective sets of cards set according to a corresponding respective choice by a respective primary player.

E.3. The apparatus of claim E, in which a primary player includes a player that solely controls a position in the game and in which h virtual player includes a player that is controlled by the set of users in divergent directions.

E.4. The apparatus of claim E, in which the game includes a four player game of Chinese poker and the set of primary players includes three real players and the virtual player includes a virtual fourth player in the game of Chinese poker.

DETAILED DESCRIPTION

I. Example Embodiments

Some embodiments may include a card game or other type of game (e.g., a single player game, a multiplayer game, a symbol based game, a card based game, a tile based game, a slot type game, a video game, and so on). One or more players may play against each other and/or a virtual or house controlled opponent in such a game. A gaming operator (which may be referred to herein as a house) may facilitate play of such a game. The gaming operator may take a portion of wagered dollars as a payment for facilitating the game (this payment may be referred to herein as a rake).

Some embodiments may include a game of baccarat, a game of Chinese poker, a any card game, any tile game, etc.

Some embodiments may shift risk to patrons and remove risk from a house when compared to traditional game versions (e.g., instead of the patron betting against a house, the patron may bet against another patron so the house does not beer the risk of the patron winning). In some embodiments, such a game may introduce skill through understanding of mathematics and/or bluffing or deception.

In some embodiments a game may be played with one or more decks or other sources of game indicia. For example, in some embodiments of a baccarat game, six decks combined together into one unified deck may be used. A deck may include a physical deck manipulated by a person or machine. A deck may include a virtual deck calculated by a computing device. A deck may include any desired element from which game elements may be determined. A deck may be shuffled and/or randomized at the start of a gaming session, at a preset penetration level, at random intervals, in response to a request, after some number of games, never, after it is completely used, and/or as desired. Some embodiments may not include a deck at all, but rather cards, symbols, tiles, etc. may be determine in some other manner as desired (e.g., random number generation).

A game may be played for real money and/or points. Some examples of point based wagering are described in U.S. Patent application 61/656,232, entitles Points and/or Money Based Gaming, which is hereby incorporated herein by reference.

A game may be played by patrons using a mobile device, a kiosk, a slot machine, a computing device, through the Internet by accessing a website, and so on. Some example devices that may be used to play a game are described in U.S. patent application Ser. No. 11/868,013 to Lutnick and entitled Game of Chance Processing Apparatus, which is hereby incorporated herein by reference.

Games may take a variety of forms as desired by a game operator and/or players of the games. For example, games may be arranged into tournaments (e.g., a multi property tournament, a single property tournament, a tournament that lasts multiple and/or a single day). As another example, games may be played on a hand to hand fashion (e.g., one hand at a time without expectation, requirement, and/or connection to other hands). As yet another example, games may be played in a table based fashion (e.g., a game that continues until a winner at a table emerges like a Texas hold 'em poker game). It should be recognized that such examples are given as non-limiting examples only and that they may be combined together in any manner (e.g., a tournament based on winning tables and/or hands) or not used at all.

Example System

FIG. 1 illustrates an example system that may be used in some embodiments. System 100 may include a web server 101, a wagering server 103, a first client device 105, and a second client device 107, and a network 109.

A web server 101 may include system that allows a player to access a website of a gaming service. The server may provide one or more players with a website and/or information about games. The webserver may act as an interface to gaming services. The web server may act as an API that allows other gaming operators or website operators to add gaming content offered through the web server 101 to their site. Web server 101 may allow a mobile device to access gaming services through a mobile app running on a cell phone.

A wagering server 103 may determine various information about a game. For example, the wagering server may calculate odds, determine cards, shuffle decks, determine outcomes, audit events, adjust accounts, maintain accounts, distribute payouts, enable games, match players, calculate a rake, and so on.

First and second client device 105 and 107 may include computer devices accessing web sites (e.g., cell phones, laptops, desktops, tablets, etc.), kiosks, stationary devices, mobile devices, cell phones running web apps, and so on. In some embodiments, a client device may include a device through which a live dealer may enter bet information and be shown calculated rake information to facilitate rake removal in a live table game.

Network 109 may include a LAN, WAN, the internet, and/or any desired communication link.

It should be recognized that FIG. 1 is given as an example only and is not a limiting structure. Various embodiments may include any desired structure in any arrangement of combination that may facilitate any functionality described herein in any combination.

Side Bet Examples

Some embodiments may include player to player and/or player to house side bets. Some of these side bets are available in traditional baccarat games and offered by the house to players in such a game. For example, a player may wager on a tie occurring, that a pair will occur in a specified or any hand, that particular cards will appear, that a particular suit will appear in some manner, and so on. In a baccarat game, a player may identify a request and a banker may decide to accept that request or not or vice versa. The odds may be set by the house or may be specified by the player or banker as desired. The banker may control whether or not a side bet is accepted or the player may have that control depending on the embodiment. This is an example only and other embodiment may require acceptance, may put acceptance in the hands of the player, and so on.

Side bets that are accepted may have their potential payouts removed from accounts of each player in the side bet and set aside until the side bet is resolved so that that amount cannot be used to wager in the game or other games or other side bets until the side bet is resolved. A rake amount may be taken by the house from the side bet amounts in some embodiments or not as desired. If a player does not have adequate funds to cover a loss of a side bet, then the side bet may be automatically declines in some embodiments, or the player may be notified that they must transfer funds into a wagering account if they desire to accept the bet.

In some embodiments, side bets may be entered into at or before a start of a game (e.g. before cards are dealt). In some embodiments side wagers may take place in the game as well or as an alternative.

For example, such an in line wager may include a wager on the identity of a next card (e.g., the next card will have a value of a 7). A banker may choose to accept or reject such a wager by the player as described above for pre-game side wagers. Various examples of in game wagers may include (e.g., the suit of the next card, a value of a next card, a value and/or suit of one or more cards that have not yet been dealt, a range of values of a one or more cards, odds vs. evens of one or more cards, greater than or less than some value for one or more cards, pairs, three of a kind to be dealt, and so on).

Side wagers may be made in some embodiments between any people not just direct participants in the game. A banker may receive all side bet requests, other people may receive them instead, and/or a house may receive them as desired. Side bets may be directed to a particular participant in a game (e.g., a player or a banker). A rake may be taken out of all such wagers.

Baccarat Examples

A game of baccarat may include a game in which the winning hand is determined according to the rules of baccarat. A game of baccarat may include a head to head game of baccarat. A game of baccarat may include a game of baccarat involving a plurality of players of any number. Such players may include human players at a real and/or virtual table. Although various examples are described in terms of a game of Baccarat, it should be recognized that such examples are not limiting. Some embodiments may include a rake based version of Baccarat while other embodiments include a rake based version of blackjack, poker, or some other game.

In some embodiments, player position may affect game play in some manner. A player position may be an actual position and/or some designation such as a marker that identifies a position of a player. For example, a rotating player may be required to pay a larger and/or smaller ante (e.g., a big or small blind). As another example, a player in a particular position (e.g., permanent, rotating, changing, alternating) may take a dealer and/or banker position that may have different responsibilities, rules, orders for taking actions, and/or other roles than other players. An example in a baccarat game may include one player controlling a banker hand while another player controls a player hand. These players may rotate (e.g., after the banker loses, each hand, etc.).

Some embodiments may include determining one or more player positions for a game. For example, a determination may be made as to which player is a banker in a game of baccarat. Such a determination may include, for example, random assignment, drawing cards and allowing the highest card drawer to pick, assignment based on who arrives first to a table, and so on. An indicator may be positioned to identify player positions (e.g., a button may be placed in front of a player that is acting as a banker in a baccarat game). In some embodiments a player positions may rotate with each hand or after some number of hands or events (e.g., after a banker losses) and the indictor may adjust in response.

In some embodiments, players in the game may sit or be placed at a table (e.g., a real table, a virtual table, etc.). The game may include a two player head to head game where two players are at the table and play against each other. Various examples are explained using this head to head variant as an example; however, it should be understood that the game may be expanded to any number of players as desired.

In some embodiments, players may wager an ante to begin a round of a game. An ante may be some set amount of money used to establish a beginning pot for the round. The amount may be the same for all players, none for some players, greater for some players, less for some players, and so on. Such differences may be based on a position of the player (e.g., a big blind, a small blind, a banker, etc.). In a tournament or multiple hand/round embodiment, such an ante may be made before each hand or round.

In response to a beginning of a game (e.g., a round or hand of a game of baccarat) and/or a placement of an ante, a respective initial set of cards may be determined for each of the players in the game. For example, each player may be dealt an initial two cards from a deck. These cards (in whatever number is used in an embodiment) may form the initial hands for each player. These initial hands may be hidden or visible to other players as desired by a particular embodiment. Hiding the cards may enable bluffing or deception while displaying the cards may prevent such actions. In a traditional baccarat game, two cards are dealt face up and the game continues without player input. In some embodiments of a rake based version of baccarat, the cards may be dealt to the players facedown so that each player may have a set of cards only known to himself.

An initial hand or final hand of a game may have its value determined based on the rules of the game being played. For example, in a baccarat game, a baccarat value of an initial hand may be based on the number or face values of the cards in the hand such that aces may be equal to 1, royals and tens may be equal to zero, and other cards may have values equal to their face value. The values of the two cards may be summed and the tens digit ignored to get a starting hand value. For example, if a ten and a nine are dealt to a first player, their baccarat value would be a nine. If an eight and a nine were dealt to a second player, that second player's initial hand baccarat value would be a seven.

In some embodiments suits of the cards may be ignored. In some embodiments, suits may be used to break ties. In some embodiments, suits may be used for bonus awards, side bets, and/or other bets.

In some embodiments, if a player's initial hand reaches a threshold value, the game may end. For example, if any (one or more) player (e.g., the player and/or banker) has a baccarat value of 8 or 9 for their initial hand, then the game may end. A player may be required to flip their cards over if they were dealt facedown and notify the other player(s) that they have achieved this threshold value. In a computer based system, the computer may perform this action for the player.

In some embodiments, the game may not end in such a situation. For example, a game may continue into one or more betting and/or card action rounds. A player may be allowed to take more cards, and/or may not be allowed to take more cards but may be allowed to not notify the other player. By not forcing the game to end at this point, players may be allowed to bluff about whether they have achieved an eight or nine and/or take a risk of increasing from an eight to a nine if desired. For example, a player may play as if they have an eight or nine while they do not in order to bluff another player into folding a hand.

In some embodiments, after an initial deal, players may enter a betting round. For example, a player or banker (or whatever player is in a first betting position) may decide to check (not bet) or raise (increase the bet from the ante or whatever the then current bet is). In no-limit variations the wager can be in any increments or amount the player selects up to the limit of their available funds/points and in limit variations the wager may be limited to a preset amount/increment.

In response to a first player taking a betting action, the other player(s) may take a responsive action. For example, if a player in the player position of a baccarat game took the first action, a player in the banker position may take a responsive action. For example, the banker may fold, check, accept a raise, re-raise, and so on. If the banker folds, the player may win. If the banker checks, then play may continue to a next part of the game (e.g., a card related action). If the player accepts a raise (e.g., calls), then the banker may add the raised amount to the pot and play may continue to a next part of the game. If the banker reraises, then the banker may add the raised amount and some additional amount to the pot. The play in that situation may return to the player to determine if the player wants to call the reraise, fold, or raise yet again. There may be some limit on the number of reraises that may occur (e.g., one reraise allowed per betting round, two reraises allowed per betting round, maximum amount per reraise, maximum total money raised per betting round, etc.).

If the game includes more than two players, then betting may continue around a table rather than going back and forth between players. So that each player at the table can call, fold, raise, check around the table before returning to the first player. Such abetting may mimic a poker style betting mechanism in some embodiments.

After a betting round, the game may continue with one or more card related actions. A player may be given an option to add an additional card to his hand (e.g., the player, the banker, the first player to wager, a player in a designated first position). The player may not be required to take such a card but rather this may be an option for the player. The additional card may be dealt face down like the initial cards or face up so that other players can see the dealt card. In some embodiments, a player may be limited from taking an additional card in some circumstances. For example, a player may be prevented from taking a card if the player has a baccarat value of an eight or nine, a player has a hand value that sums to greater than a seven, and so on. In some embodiments, in addition to and/or as an alternative to requesting a new card, a player may replace and/or discard an existing card.

In some embodiments, each player may make such a card related action in a card action round. In some embodiments, a single player may make such an action in such a round. Each such round may be followed by a betting round and then another card related action round.

For example, after the card related round, another betting round may take place. This betting round may start with the same player that started the first betting round which may be the same player that made a card action. It should be recognized that these players need not be the same player for example, the second betting round may be started by the banker or some other player. Thus subsequent betting round may operate similar to the round described above (e.g., fold, check, call, raise, reraise, actions being available to players) with a same or different starting person.

After such a subsequent betting round, play may return to another card related round. A same or different one or more players may be involved in such a subsequent card round. For example, a banker may be given a choice of card related actions in a second round if a player is given such choice in a prior round or vice versa. The person may not be required to take such a card but rather this may be an option as in the prior card round. Such a subsequent betting round may operate similarly to prior betting rounds (e.g., with or without restrictions on when a card may be taken, with or without other players being given the ability to take cards, etc.).

In some embodiments, if the banker or subsequent player does not take another card there may be no subsequent betting round in relation to that card action round. If the banker or subsequent player does choose to take a card, then there may be a subsequent betting round. In some embodiments there may always or never be a subsequent betting round. In some embodiments, the player given control over a prior card related round may have begun a subsequent betting round (e.g., if the banker is given an option to take a card, then the banker may begin the betting round). In other embodiments, betting and/or card related rounds may always begin with a same person. A wagering round may occur similarly to those described above with call, check, raise, re raise and fold options.

In some two player variants, play may end at this point (e.g., after each player has controlled a card action round and a betting round). However, in other variants, players may be given subsequent chances to add cards to their hand. For example, players may continue adding cards for up to two cards, three cards, any number of cards they want as long as they have less than a threshold hand score when they take a card (e.g., less than 8 or 9 in card value or baccarat value), and so on. In a game with more players, play may continue until all players have had an opportunity to control a card action and betting round. After some, all, one, each and so on card related action round, a player who controls a card action round may be given an opportunity to lead a betting round.

At the end of a game, a winner may be a last player that has not folded and/or a player with a highest score for their hand. The winning player may take the pot minus some rake that the house takes. The rake may be a percentage of the ante, a percentage of the total pot, and so on. If the result is a tie because two or more players have the same value at the end of a game, the tied players may split the pot with the rake removed by the house. In some embodiments, a rake may not be removed if there is a tie between all players.

In some embodiments, gameplay of a single hand may continue until an ending trigger occurs. For example, an ending trigger may include a person making a bet designated as an ending bet. An opponent may accept the ending bet to end the hand or reject the ending bet to have the hand continue. In some embodiments, a player may not be able to reject such a bet but the bet may only be made in certain circumstances (e.g. by the banker, by the player, when the person has a certain hand or baccarat value, when the person has certain number of cards, etc.). In some embodiments, the rejection of such a bet may include a cost (e.g., a doubling of the bet into the pot). In some embodiments, the hand may continue until no person may accept more cards in a card round that is then followed by a betting round (e.g., if players may accept cards until their hand value or baccarat value reaches some threshold then round in which both players reach that threshold or one player reaches that threshold may be an ending round).

In some embodiments, if a player reaches a threshold number of cards in a hand, the player may win automatically. For example, a player may be able to continue taking cards into a hand until the player has a summed card score of 8 or 9 (that is not a baccarat score). If the player reaches 4, 5, 6, or some other threshold number of cards without reaching or exceeding this number, then the player may win the hand and/or receive some bonus prize.

Some embodiments may include a post hand bet. For example, a player may be offered a wager that the next card drawn will not reset their baccarat hand (i.e., make it reset from nine to zero by increasing over 9). That bet may be a side bet between players, a bet with the house, and so on. Such a bet may be a bet of the pot with the house, a bet of the pot against the losing player, and so on. Such a bet may be the prerogative of the winning player to accept or the losing player to accept in different embodiments. In some embodiments, both players must accept the bet. If the winning player wins, the player may double the pot.

Gameplay may continue with another hand/round played in a similar manner. Game play may continue until one or more players leaves a table, until one or more players runs out of money at the table, until some number of games are played, and so on. A player may move to a next round of a tournament after winning a hand and/or a table and continue gameplay with different opponent(s).

Figure 2:
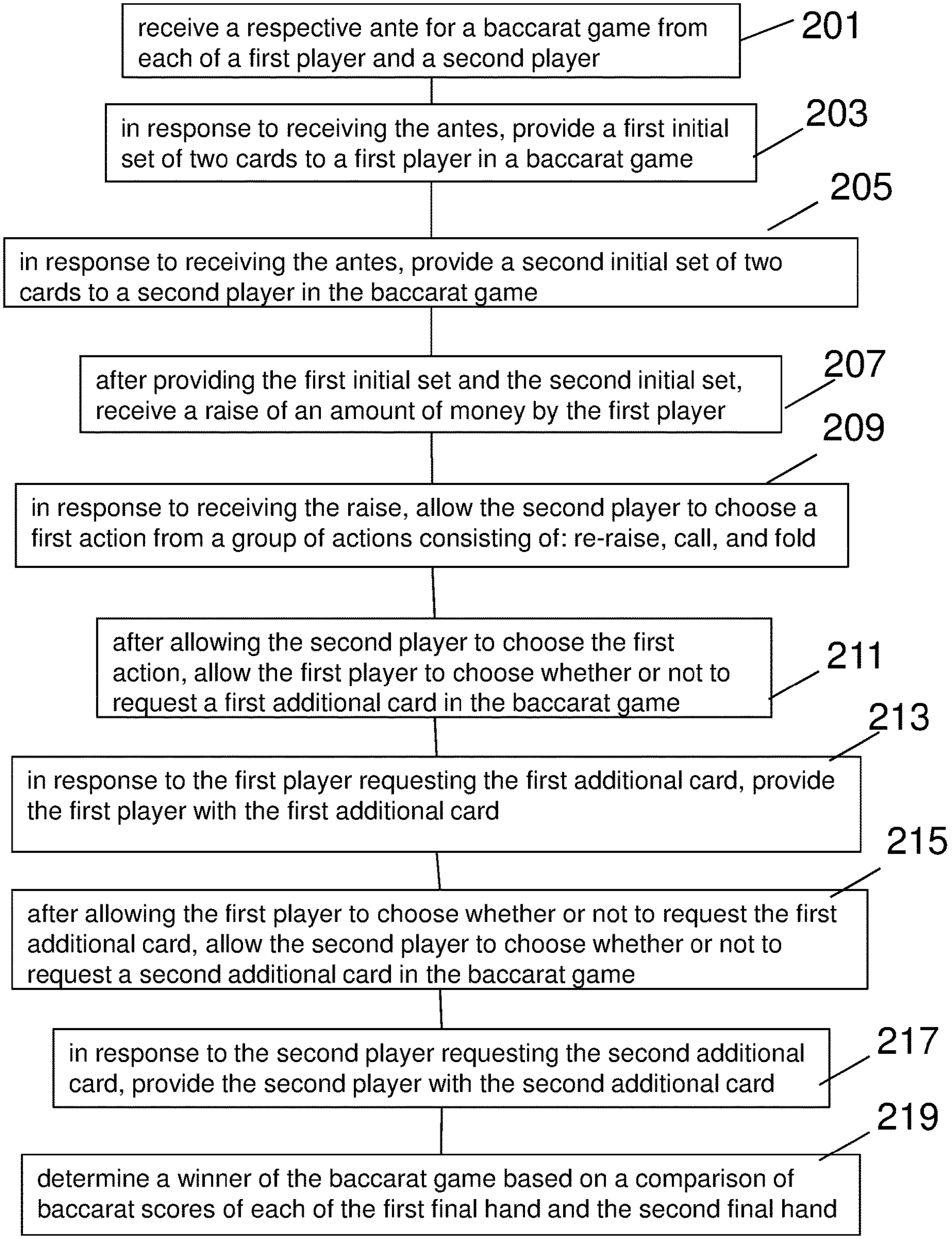
FIG. 2 through FIG. 5 show an example method that may be performed in some embodiments.

FIG. 2 illustrates an example method of facilitating a baccarat game in which each player is given an option to take another card in card rounds and in which between such rounds there is a betting round. Such a method may be performed, for example by one or more components of system 100.

Players may be matched together for a game based on social networks and/or game play preferences. For example, a good player may be matched against other good players based on their history of play. People in a same friend group may be matched together with some preference over matching strangers together. People may identify the types of tables (e.g., limit, no limit, tournament, non-tournament, minimum, maximum wagers, etc.) and may be placed or matched with other people at tables with those characteristics.

As indicated at block 201, some embodiments may receive a respective ante for a baccarat game from each of a first player and a second player. Some embodiments may include determining which of the players is a banker and which is a player in the baccarat game. The antes may be placed into a pot for the game that the winning player may win.

As indicated at block 203, in response to receiving the antes, some embodiments may provide a first initial set of two cards to a first player in a baccarat game. The first player may control the hand of the player in the baccarat game;

As indicated at block 205, in response to receiving the antes, some embodiments may provide a second initial set of two cards to a second player in the baccarat game. The second player may control the hand of the banker in the baccarat game.

In some embodiments, the first initial set of two cards are provided such that the second player cannot view the first initial set of two cards and the second initial set of two cards are provided such that the first player cannot view the second initial set of two cards. For example, they may be dealt facedown.

In some situations, one or more of the initial hands may have a baccarat value of 8 or 9. In some embodiments if such a situation occurs, the game may end without additional cards being offered. In other embodiments, betting and additional card rounds may progress as described anyways.

As indicated at block 207, after providing the first initial set and the second initial set, some embodiments may receive a raise of an amount of money by the first player. The first player may control a first round of wagering by virtue of being in the player position rather than the banker position in the baccarat game. A raised amount may be added to the pot into which the antes are placed. The player may have the option to not raise by calling and/or folding if desired but raise is given as an example action.

As indicated at block 209, in response to receiving the raise, some embodiments may allow the second player to choose a responsive action. Such a first action may be chosen from a group of actions consisting of: re-raise, call, and fold. If the second player folds, then the second player may lose and the first player may win whatever is in the pot and the game may end. If the second player calls, the second player may add the raised amount to the pot. If the second player reraises, the second player may add the raised amount and some additional amount to the pot and the first player may be asked to perform some responsive action (e.g., fold, call, reraise again). Some embodiments may not allow reraise or may limit reraises.

As indicated at block 211, after allowing the second player to choose the responsive action, some embodiments may allow the first player to choose whether or not to request a first additional card in the baccarat game. This may occur if neither player folds in the betting round. A player may choose to add a card to better their baccarat hand or to not add a card if they believe their baccarat hand is good enough and/or to bluff the other player.

As indicated at block 213, in response to the first player requesting the first additional card, some embodiments may provide the first player with the first additional card. The first additional card may be provided such that both the first and second players can view the first additional card (e.g., face up). The first initial set of two cards together with the first additional card may form a first final hand in the baccarat game.

After providing the first player with the first additional card and prior to allowing the second player to choose whether or not to request the second additional card, some embodiments may receive another raise of another amount of money by the first player. The first player may control the other round of wagering by virtue of being in the player position rather than the banker position in the baccarat game. A raised amount may be added to the pot into which the antes are placed. The player may have the option to not raise by calling and/or folding if desired but raise is given as an example action.

In response to receiving the other raise, some embodiments may allow the second player to choose a responsive action. This responsive action may be chosen from the group of actions consisting of: re-raise, call, and fold. This responsive action may be similar to those discussed above.

As indicated at block 215, after allowing the first player to choose whether or not to request the first additional card, some embodiments may allow the second player to choose whether or not to request a second additional card in the baccarat game. Similar to allowing the first player to add a card, this may include a choice by the player rather than an imposition.

As indicated at block 217, in response to the second player requesting the second additional card, some embodiments may provide the second player with the second additional card. The second additional card may be provided such that both the first and second players can view the second additional card (e.g., face up). The second initial set of two cards together with at least the second additional card may form a second final hand in the baccarat game.

After providing the second player with the second additional card, some embodiments may receive a second raise of a second amount of money by the second player. The second player may control this round of wagering by virtue of being in the banker position rather than the player position in the baccarat game. A raised amount may be added to the pot into which the antes are placed. The player may have the option to not raise by calling and/or folding if desired but raise is given as an example action.

In response to receiving the second raise, some embodiments may allow the first player to choose a responsive action. This responsive action may be chosen from the group of actions consisting of: re-raise, call, and fold. This responsive action may be similar to those discussed above.

Some embodiments may include additional card adding rounds for one or more of the first and second players and/or one or more associated betting rounds. In some embodiments, such card adding rounds may be provided, for example, until a summed numerical value of the hand equals 8 or greater when all cards are given their face value including face cards being worth ten and aces being worth one.

As indicated at block 219, some embodiments may determine a winner of the baccarat game based on a comparison of baccarat scores of each of the first final hand and the second final hand. For example, the hand with the highest baccarat score may win.

In some embodiments, receiving may include receiving electronic communication from one or more computing devices by a computing device of a gaming provider. In some embodiments, providing may include presenting information though a user interface, assigning card values to a game, and so on. In some embodiments, allowing may include presenting an option a player through a user interface.

Some embodiments may allow the first player to choose from a plurality of side bets that are each based on a sub portion of the baccarat game. The first player may be given the opportunity to choose side wagers by virtue of being in the player position rather than the banker position. The side wagers may be entered with the second player. In response to the first player choosing a side bet of the plurality of side bets, some embodiments may determine whether the second player has sufficient money in a wagering account to enter into the wager. Sufficient money may include money that the second player would need to pay if the second player loses the side bet. In some embodiments, in response to the second player having sufficient money, a side bet may be formed. The side bet may be formed before and/or after the first and second initial set of two cards are provided. In some embodiments, observers of the baccarat game may be provided with an opportunity to enter into a side bet based on a subpart of the baccarat game (e.g., with the banker, with the player, with other observers, with the house, etc.).

It should be recognized that this method is an example method only and that various embodiments may include any desired actions in any desired ordering and combination.

It should be recognized that eight and nine are example threshold hand values used in some embodiments, baccarat is an example game used in some embodiments, two players are an example number of players used in some embodiments. Number and arrangement of card related and betting rounds are given as examples only.

In some embodiments, the game be played head to head, but variations can include the traditional Chemin de fer rules where in multiple players can bet against the Banker, but only the highest wagering Player controls the Player side. Other variations can include multiple patrons playing collectively against each other, results would still be determined the same way, and the betting would rotate in accordance to the movement of the button and game provider rules.

Baccarat is an example game only. Other games may be based on blackjack, war, faro, cards, tiles, symbols, etc.

Chinese Poker Examples

Some embodiments may include a game of Chinese poker. A game of Chinese poker may include a game in which the outcome is determined based on the rules of the game of Chinese poker. It should be recognized that while various examples are given in terms of Chinese poker that other embodiments may include other games as desired.

In traditional Chinese poker, four players play against each other. Each player receives 13 cards from a standard 52 card deck. Each player then divides his 13 cards into three separate hands (one with 5 cards called the back, a second with 5 cards called the middle, and a third with 3 cards called the front). The back must have the highest ranking poker ranking, the middle must have the middle ranking poker ranking and the front must have the lowest ranking poker ranking. Flushes and straights may be ignored in the front hand ranking system in some implementations of Chinese poker. If the ranking requirements are not complied with, the player has misset his hand and loses (e.g., may lose as if he lost all three hands against all three opponents).

After all players have set their hands, the players reveal their three hands to each other. In some implementations of Chinese poker if all of the hands of a player are straights or flushes, the player may automatically be a winner against all other players. Players are traditionally not able to change their hands after they are set but reveal the hands as set before any information about other player's hands is known. Once the hands are revealed in their set forms, the hands are scored against one another.

Typically, scoring occurs in terms of units or points. The points may then correspond to some amount of money agreed to by the players. A player may earn one point from each opponent for each front, middle, or back that the player beats. In some implementations, a player may earn an additional point if the player wins two of the hands against an opponent. In some implementations, a player may earn an additional point if the player wins all three of the hands against an opponent. There are two typical scoring systems that follow these general rules known as the 2-4 scoring method and the 1-6 scoring method. In the 2-4 method, a player receives one point for each hand he wins against an opponent and 1 unit for winning two or more hands against an opponent. If there is a tie for one hand, then no points are earned for that hand. In the 1-6 method, a player receives one point for each hand he wins against an opponent and three points for winning all three hands against an opponent.

Some implementations may include bonus points that may be referred to as royalties. Such bonus points may be awarded for earning particular hands (e.g., straight flush, four of a kind, full house, three of a kind, etc.). For example, for each of such rankings earned in a hand of a player, the player may earn a bonus point from each of his opponents. In some implementations, the bonus points may only be awarded to a winning hand. Bonus points may differ by ranking and/or by which hand the ranking occurs (e.g., higher rankings may earn more bonus points and/or lower hands may earn more bonus points).

In some implementations, a player may surrender a game. Surrendering may occur prior to revealing the hands. In some implementations, prior to surrendering, players may be required to announce bonus points they expect to earn. If a player surrenders, he may pay an amount of points equal to losing two hands but may not pay for losing all three or the bonus points. In some implementations surrender may not be an option. In some implementations, surrender may be restricted if a player earns a natural (e.g., three straights, three flushes, six pairs, thirteen unique hands). If a player earns such a natural, then the other players may not be allowed to surrender.

The points are awarded in a head to head manner, so more than one player may end up winning more points than they lose in a particular game of Chinese poker. Moreover, because the game is scored in such ahead to head manner rather than a group manner, it is possible for different players to be playing for different stakes. Each player's points may be tracked separately in such an embodiment rather than treated as a commodity so that at the end of play, money may be exchange in accordance with an exchange schedule. Players may even play against one player for a different amount of points than that player plays against the other players in a game. Various combinations of differing values for points may be used in various embodiments as desired and a computer system may track the points in a manner that allows reconciliation of points to a monetary amount as desired. For example, a table may record a money value for points between each player pair and may record a point level between each player pair.

Rake Chinese Poker Examples

Figure 3:
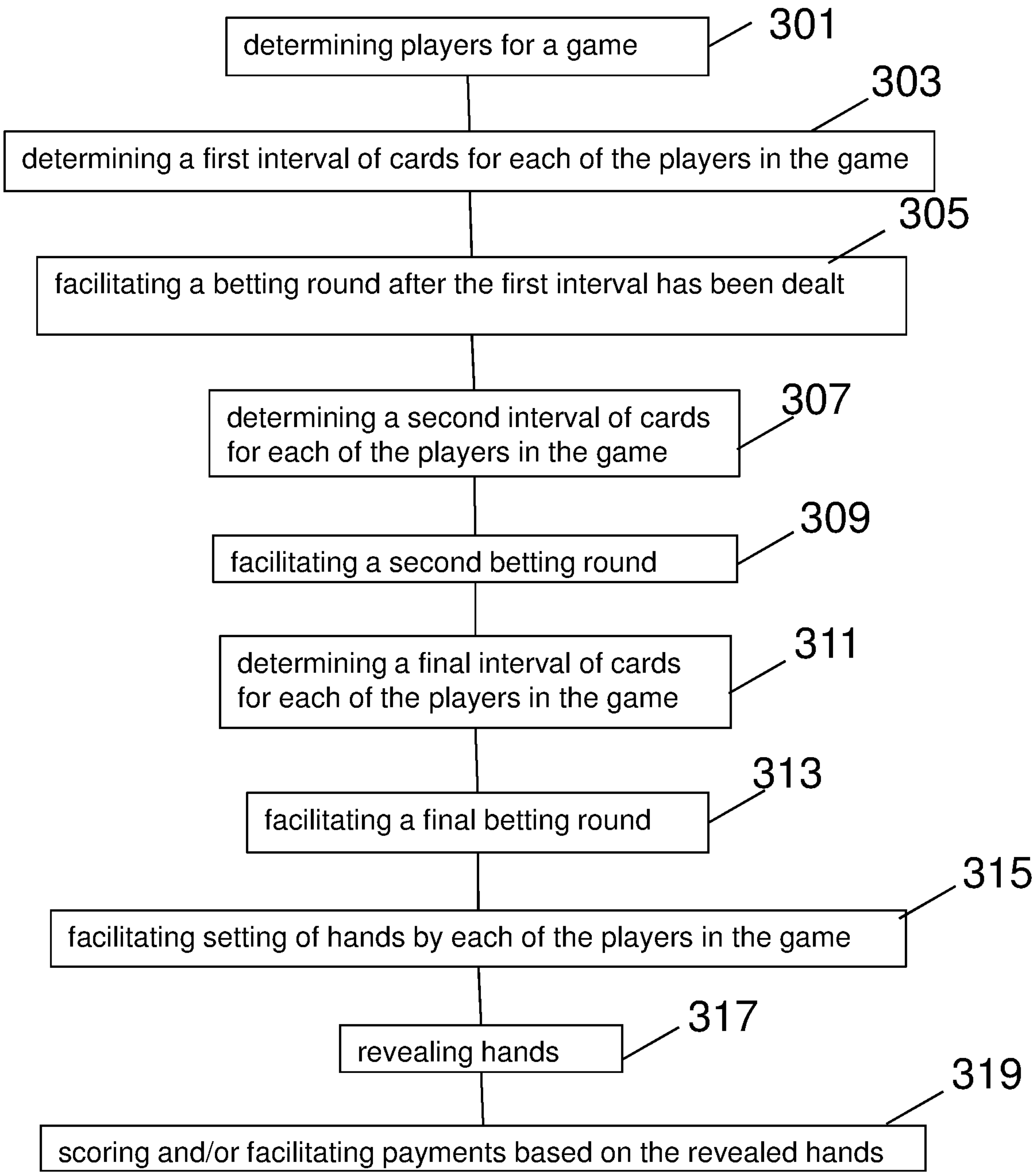

Some embodiments may include a variant of Chinese poker that may add an element of interaction and/or skill that a traditional variant may not have. Such a variant may include opportunities to wager, bluff, fold, and so on. Such a variant may include a rake taken by a gaming operator that facilitates the game play. FIG. 3 illustrates an example method that may be used in some embodiments. Such a method may be performed by a computing device to facilitate an electronic game and/or may relate to a physical table game played in person. Such a variant on Chinese poker may add a level of skill and enjoyment that is not available in traditional variants by allowing players to bluff, bet, and otherwise interact with one another in a new manner. A system such as that of FIG. 1 may be used in some implementations to facilitate such a method. Such a method may include transmission to and/or receipt of data by one or more computing devices, calculation of scores, comparisons of hands, and so on by a computing device, and/or any desired action processed by any type of device as desired.

Some embodiments may include dealing cards to players in a Chinese poker game in intervals. Between intervals, players may be able to place bets, raise, fold, check, and so on. At the end of intervals and betting, players may set their hands and be scored according to bets and hand rankings.

As indicated at block 301, some embodiments may include determining players for a game. The player may be matched together in a game. For example, through an internet gaming provider, players may be placed at a virtual table that may have some desired wagering characteristics (e.g., minimum wagers, maximum wagers, point to money schedule, etc.). As another example, players may sit at a physical table. It should be recognized that determining players for a game may be performed in any desired manner. Such a determination may include determining players that paid an ante and/or that agreed to some valuation of points in the game.

As indicated at block 303, some embodiments may include determining a first interval of cards for each of the players in the game. A first interval may include any number of cards such as five cards for each player in one implementation. Such a determination may be made based on reference to a data structure that stores information about a virtual deck. Virtual cards may be drawn from the virtual deck by referencing the data structure for a next card in the virtual deck. That next card may be provided to a player and then the data structure may be accessed until the cards desired have been determined for the players. In other embodiments, an actual deck or other method of determining cards may be used as desired. After such a determination, each player may have a unique set of the cards equal to the number of cards in the first interval dealt to them from some source of card information (e.g., a deck).

Each player may be presented with information identifying their first interval of cards. In some implementations, other players may not be shown their opponents' first interval of cards. For example, each player may be shown, through a display device of a mobile device or some other computing device the cards that make up their own first interval. As another example, players may physically be given their own first interval of real cards at a physical table.

As indicated at block 305, some embodiments may include facilitating a betting round after the first interval has been dealt. A betting round may take any form desired. For example, a betting round may include a group betting round where bets are made for the entire group together (e.g., player 1 offers to raise the value of points from $100 to $200 to the entire table and all players may agree or fold). Rather than a dollar value, a percentage of value may be used in some embodiments so that players with an initial value of points that are desperate may have a more uniform raising application (e.g., player 1 offers a 10% raise in the value of points, but that may mean $1 per point to player 2 and $100 dollars per point to player 3). As another example, a betting round may include a head to head betting round where bets are made between individual players separately (e.g., player 1 offers player 2 to raise the value of their specific points and player 2 may agree between the two players or fold against player 1). Accordingly, different raises and folds may be performed between different players. In some embodiments, such raises, folds, and so on may be stored in a data structure, such as a table that records points and valuation of points by player pairs as discussed elsewhere.

In some embodiments, in a betting round, a player may be able to raise, check, and/or fold. An interface may be presented on a gaming device through which a player may enter a raise amount, choose to fold, choose to check, and so on. For example, a first player may raise points from $100 to $200. Each other player may then be able to call the raise, re-raise the raise, or fold. An interface may present the options and initial choice of the first player to the other players. In some embodiments, there may be some limit on the level of a raise or the number of times a reraise may occur. Betting rounds in a group betting situation may go around the players such as in a clockwise manner so that each player is presented with a cumulative raise and given option at that point. In some embodiments, a first player in a raising round may rotate each game and may be tracked by a button. If a player folds, the player may be scored at the end as if the player surrendered as described above with points evaluated at a last called dollar value. In a head to head betting implementation, a similar set of betting may occur with a first player initiating separate betting rounds with each other player and then the other players doing similar rounds with each other.

As indicated at block 307, some embodiments may include determining a second interval of cards for each of the players in the game. Determining cards for the second interval may be substantially similar to determining cards in the first interval. After such a determination, each player may have a unique set of the cards equal to the number of cards in the first interval plus the number of cards in the second interval dealt to them from some source of card information (e.g., a deck). The second interval may include any number of cards, such as five cards in one implementation. Each player may be presented with information identifying their current set of cards after the dealing of the second interval through some display device and/or provided with physical cards making up their second interval at a physical table.

As indicated at block 309, some embodiments may include facilitating a second betting round. A second betting round may take place substantially similar to the first betting round. A second betting round may again allow raising, checking, folding, and so on in a cumulative fashion from the first betting round.

As indicated at block 311, some embodiments may include determining a final interval of cards for each of the players in the game. Determining cards for the final interval may be substantially similar to determining cards in the first and second intervals. After such a determination, each player may have a unique set of the cards equal to the number of cards in the first interval plus the number of cards in the second interval plus the number of cards in the final interval dealt to them from some source of card information (e.g., a deck). The final interval may include any number of cards, such as three cards in one implementation so that each player has a total number of cards for the game (e.g., 13 in Chinese poker). Each player may be presented with information identifying their current set of cards after the dealing of the final interval through some display device and/or provided with physical cards making up their final interval at a physical table.

As indicated at block 313, some embodiments may include facilitating a final betting round. A final betting round may take place substantially similar to the first betting round and the second betting round. A final betting round may again allow raising, checking, folding, and so on in a cumulative fashion from the first betting round and the second betting round.

As indicated at block 315, some embodiments may include facilitating setting of hands by each of the players in the game. For example, a computing device interface may allow a player to arrange the cards dealt to the player into one of three typical Chinese poker hands. Each player in a game may be required to make such an arrangement unless the player has folded or otherwise surrendered a game. A touch screen interface may allow a player to drag cards around into the hand arrangement that the player chooses. In a physical implementation the player may lay the cards out in a table according to the desired hand arrangement. A computing device, such as a gaming server, may receive arrangements of hands and use those arrangements to determine point distributions and/or payments.

As indicated at block 317, some embodiments may include revealing hands. For example, a computing device may transmit hand information identifying hand arrangements of each player to each other player in a game so that an interface may display the arrangements of all hands in a game.

As indicated at block 319, some embodiments may include scoring and/or facilitating payments based on the revealed hands. Hands may be scored according to a Chinese poker scoring method such as those described elsewhere and/or any other desired scoring method. The points may be converted into money payments between players with the points being worth whatever the latest level of bets in the betting rounds has resulted in. For example, if the last bet was for $1000 per point, then the points may be resolved at that level for players that remain in the game at to the end of the game. Players that have left the game by folding at earlier times in the game may have points evaluated based on the last bet that they accepted and/or the original point value if they folded before accepting or making a bet that was accepted. So, for example, if player 1 stays in the game until the end and the last raise was made by player 1 to $1000 and player 2 also stays in the game until the end, then points between player 1 and player 2 will be evaluated at the $1000 level. If player 3 raised during the first betting round to $200 a point and then later folded when a reraise occurred, then player 3 may have points evaluated at $200 between player 3 and other players. Determination of such point values may be made based on a reference to a data structure that stores point values for players as discussed elsewhere herein. It should be recognized that various player point levels may be determined according to any method as desired and these are non-limiting examples.

It should be recognized that various example are given as non-limiting. For example, Chinese poker is just an example game and other games may be played in various embodiments, interval sizes of five and/or three are just example sizes, the intervals and betting rounds are given as examples only and any number of rounds may be used in various embodiments, timing of betting and intervals are given as examples only and any arrangement of actions may be performed in various embodiments, and so on.

In some embodiments, during one or more betting rounds, a player may have a freeze option. A freeze option may allow a player after receiving a raise from a previous player to respond to the raise by rejecting the raise but not folding. The offer of a raise may be rejected by the specific player but other players may be able to accept the raise. Accordingly, the player may be able to freeze the value of points for himself at that level but allow other players to continue to increase the value of points for themselves. Aside from adding poker skill, this has the ability to mix players of varying wagering stakes as a smaller bankrolled player can simply freeze and stay in the game, and those desiring higher betting limits can simply raise to their mutual betting satisfaction. In some embodiments, a player may thaw a freeze later in the game and/or be prevented from thawing a frozen hand and thereby be stuck at that point level for the rest of a game.

Some embodiments may include a risk module that may limit betting by one or more players. For example, a play may not be allowed to enter into wagers that could result in a requirement to pay out more money that the player has in a wagering account. A risk module may determine a maximum number of points that the player may lose in a game and determine the current value of those points based on raises made in the game. If the player attempts to raise or accept a raise in a manner that would cause the number of points times the value of each point to exceed a wagering account balance, the player may be prevented from making such a wager. For example, the option to submit such an action may not be permitted through an interface, such a action may be rejected by a gaming server, a player may be asked to increase an account balance, and so on.

Face Up Chinese Poker Examples

Figure 4:
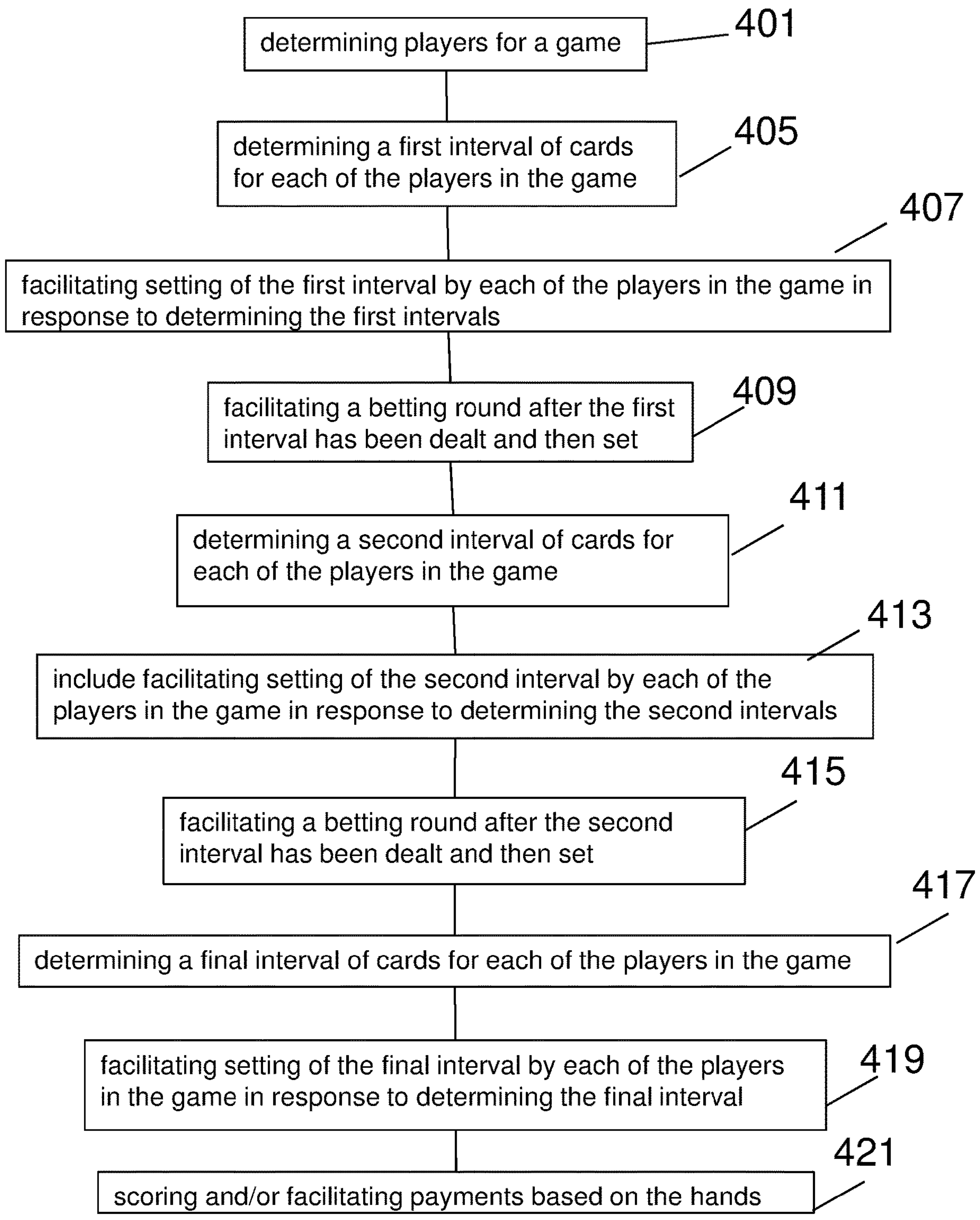

Some embodiments may include a variant of Chinese poker that includes one or more cards in a hand being set before all cards have been dealt and/or one or more cards being provided face up. Such a variant include opportunities for wagering, folding, bluffing, guessing at future cards, and so on. Such a variant may include a rake taken by a gaming operator that facilitates the game play. FIG. 4 illustrates an example method that may be used in some embodiments. Such a method may be performed by a computing device to facilitate an electronic game and/or may relate to a physical table game played in person. Such a variant on Chinese poker may add a level of skill and enjoyment that is not available in traditional variants by allowing players to choose hand positions before all cards are dealt, bet, calculate expected hands, and otherwise interact with one another in a new manner. A system such as that of FIG. 1 may be used in some implementations to facilitate such a method. Such a method may include transmission to and/or receipt of data by one or more computing devices, calculation of scores, comparisons of hands, and so on by a computing device, and/or any desired action processed by any type of device as desired.

Some embodiments may include dealing cards to players in a Chinese poker game in intervals. Players may be required to set their hands in response to receiving each interval of cards. Between intervals, players may be able to place bets, raise, fold, check, and so on. At the end of intervals and betting, players may set their hands and be scored according to bets and hand rankings. One or more intervals may be dealt face up and/or face down in any combination.

As indicated at block 401, some embodiments may include determining players for a game. Such determination may be similar to that of block 301.

As indicated at block 405, some embodiments may include determining a first interval of cards for each of the players in the game. A first interval may include any number of cards such as five cards for each player in one implementation. Determining a first interval may be similar to such a determination of block 303. After such a determination, each player may have a unique set of the cards equal to the number of cards in the first interval dealt to them from some source of card information (e.g., a deck). Each player may be presented with information identifying their first interval of cards. For example, each player may be shown, through a display device of a mobile device or some other computing device the cards that make up their own first interval. As another example, players may physically be given their own first interval of real cards at a physical table.

As indicated at block 407, some embodiments may include facilitating setting of the first interval by each of the players in the game in response to determining the first intervals. Each player may be required to place his first interval of cards among his three Chinese poker hands. The set cards may be set there for the rest of the game. Setting the cards may include operating a computing device interface to place the cards in a hand (e.g., using a touch screen to drag cards into place). Such information may be received by a gaming server to track the play of the game. In some embodiments, cards set into the hands may be shown to other players in the game (e.g., as face up cards). Such information may be transmitted from a gaming server to computing devices of the other players to be displayed through interfaces. Some embodiments may include physical cards at a gaming table being placed in hand positions. In some embodiments, the first interval may not be shown face up, but rather may be kept hidden. A time limit may be enforced on the setting by each player so that a game continues to move forward. Lack of setting in that time period may result in a misset.

As indicated at block 409, some embodiments may include facilitating a betting round after the first interval has been dealt and then set. A betting round may take any form desired, such as a form described above as in block 305. In some embodiments, in a betting round, a player may be able to raise, check, fold, and/or freeze. It should be recognized that not all of these options may always be available in all implementations and/or situations. An interface may be presented on a gaming device through which a player may enter a raise amount, choose to fold, choose to check, and so on. For example, a first player may raise points from $100 to $200. Each other player may then be able to respond through a respective interface of a computing device.

As indicated at block 411, some embodiments may include determining a second interval of cards for each of the players in the game. A second interval may include any number of cards such as five cards for each player in one implementation. Determining a first interval may be similar to such a determination of block 405. After such a determination, each player may have a unique set of the cards equal to the number of cards in the first interval plus the number of cards in the second interval dealt to them from some source of card information (e.g., a deck). Each player may be presented with information identifying their current set of cards after the dealing of the second interval through some display device and/or provided with physical cards making up their second interval at a physical table.

As indicated at block 413, some embodiments may include facilitating setting of the second interval by each of the players in the game in response to determining the second intervals. Setting may be similar to setting in block 407. In some embodiments, cards set into the hands may be shown to other players in the game (e.g., as face up cards). In some embodiments, some information may be kept hidden rather than shown face up (e.g., the second interval and later intervals may be hidden but the first interval may be face up, the first interval may be hidden but later intervals may be shown face up, etc.).

As indicated at block 415, some embodiments may include facilitating a betting round after the second interval has been dealt and then set. A betting round may take any form desired, such as a form used in block 409.

As indicated at block 417, some embodiments may include determining a final interval of cards for each of the players in the game. A final interval may include any number of cards, such as three cards for each player in one implementation. Determining a final interval may be similar to such a determination of block 405 and/or 411. After such a determination, each player may have a unique set of cards equal in number to the number of cards in the first interval plus second interval plus final interval (and any other intervals in the game) dealt to them from some source of card information (e.g., a deck). Each player may be presented with information identifying their current set of cards after the dealing of the final interval through some display device and/or provided with physical cards making up their final interval at a physical table.

As indicated at block 419, some embodiments may include facilitating setting of the final interval by each of the players in the game in response to determining the final interval. Setting may be similar to setting in block 413 and/or block 407. In some embodiments, cards set into the hands may be shown to other players in the game (e.g., as face up cards). In some embodiments, some information may be kept hidden rather than shown face up (e.g., the final interval may be hidden but the earlier intervals may be face up, the first interval may be hidden but later intervals may be shown face up, etc.).

Some embodiments may include a final betting round. A final betting round may include a round similar to that at block 409 and/or 415. In some embodiments where setting is done before betting and all set cards are shown to other players face up, such a final betting round may not be used (e.g., because after the final cards are set, all of the hands may be visible, so the winner may already be known). In some embodiments, setting and/or display of set cards may take place after a betting round rather than before a betting round so that such information may not be known to the players yet. Accordingly, a betting round may take place after the dealing of cards rather than after the setting of cards to maintain information obscurity. In some embodiments where not all cards are known to players but only some cards are shown face up, a betting round may take place before or after a final interval is set and still the winner may be unknown (e.g., the first interval may be kept face down until after the final betting round even though other cards are shown face up, the first interval may be face up but other intervals may be face down until after the final betting round, etc.).

Some embodiments may include revealing hands. For example, in some implementations where part of the cards are dealt face up and part are dealt face down, the cards that are dealt face down may be revealed in response to an end of a final betting round. A computing device may transmit hand information identifying hand arrangements of each player to each other player in a game so that an interface may display the arrangements of all hands in a game. In some embodiments where cards are all placed face up in response to setting, the cars may not need to be separately revealed because they may already all be revealed.

As indicated at block 421, some embodiments may include scoring and/or facilitating payments based on the revealed hands. Hands may be scored according to a Chinese poker scoring method such as those described elsewhere and/or any other desired scoring method. Scoring and/or facilitating payment may be similar to such scoring and/or facilitating at block 319.

It should be recognized that various example are given as non-limiting. For example, Chinese poker is just an example game and other games may be played in various embodiments, interval sizes of five and/or three are just example sizes, the intervals and betting rounds are given as examples only and any number of rounds may be used in various embodiments, timing of betting and intervals are given as examples only and any arrangement of actions may be performed in various embodiments, and so on. For example, some embodiments may include some cards face up and some face down. Some embodiments may include all cards face down. Some embodiments may allow some cards to remain unset until an end of a game (e.g., the first interval may be set at the end of a game rather than the end of the dealing of the first interval and may remain secret while other intervals are set and revealed after each interval). It should be recognized that any combination of revealing, not revealing, setting, remaining unset, betting or not betting, betting before or after other actions, and so on may be used.

In some embodiments, requiring setting as intervals progress may cause a player to incorrectly set a hand (e.g., resulting in a misset hands). For example, a player may be attempting to form a particular hand rank but may not achieve that hand rank because the player did not receive the cards that the player hoped to receive. In some embodiments by allowing some card to be unset (e.g., the first interval) until the end of the game, players may have a greater chance of achieving their desired hands.

In some embodiments, players may begin setting hands in each round of hand setting after each interval is dealt in some order. For example, a player having a button may set hands first each time through a game. The button may rotate around a table after each game and/or between rounds. That same player may start in a corresponding betting round or rounds. In some embodiments, by successive revealing information by player, the later players may have more information than the earlier players. Accordingly, those players may have an increased ability to use strategy and mathematics based on the knowledge of other players' cards. In some implementations, this asymmetric information may be desired. In other implementations, players may set cards simultaneously so that the information is revealed together rather than successively to prevent this asymmetry in information.

Some embodiments may not include separate betting rounds. Rather, a single bet may be placed in each game. In some embodiments, bets may be made on a per game basis or in some game group basis. For example, bets may be placed on a group of four games (e.g., with a button going around a four player table for those four games). Points may be summed across the four games to form a set of games score. That score for the set of games may be used to determine a winner of a bet on the set of games. In another example, a set bet may be resolved based on the number of games won by a player rather than the number of points earned in individual games being summed. Such a set bet may be in addition to and/or alternative to a game level bets that may resolve at each game. Some embodiments may include a further abstracted bet that may be based on a set of sets. This may be called a match bet. A match bet may be resolved based on the number of set bets won by a player. For example, if a player wins more sets of four games each, than another player, that player may win a match made up of those sets. Such a match bet may not be determined based on point in individual games or sets but rather based on the number of sets won.

Virtual Player Examples

Figure 5:
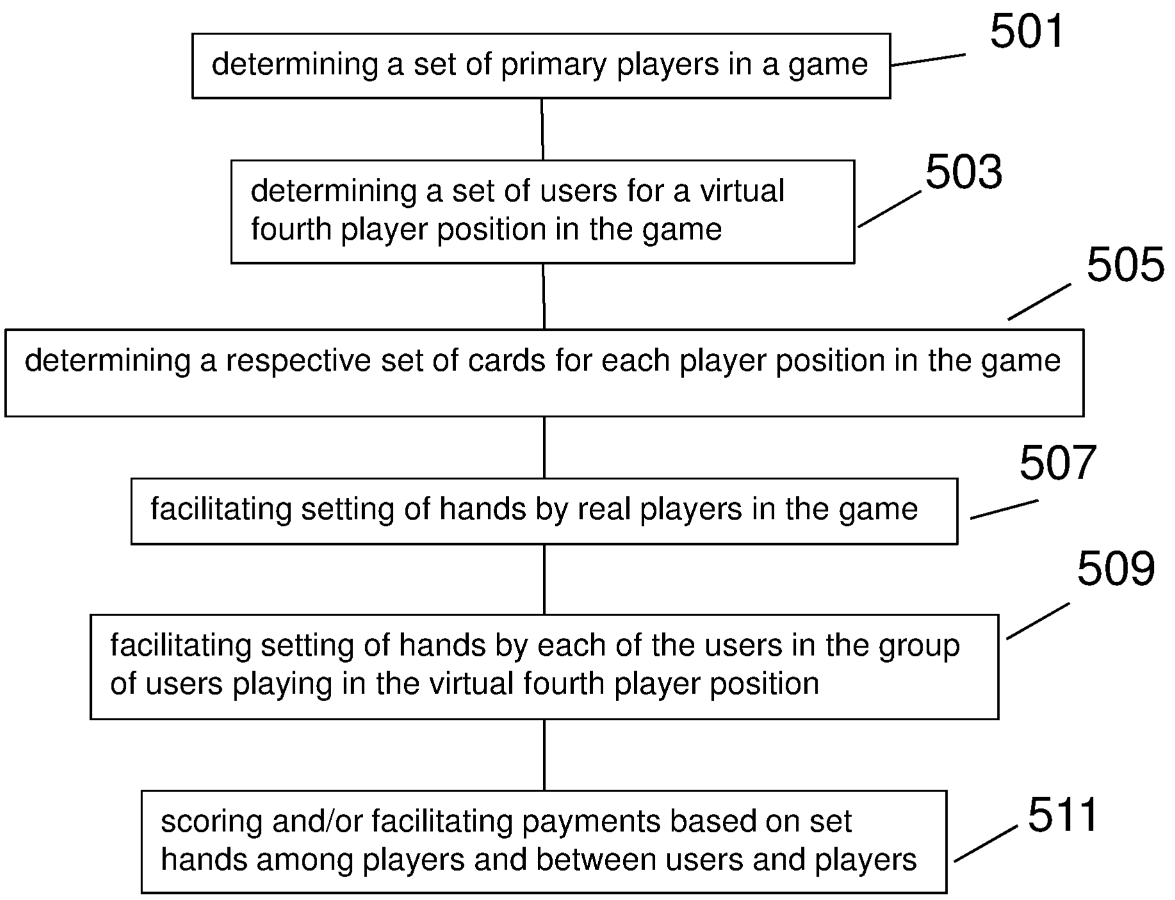

Some embodiments may include a variant of Chinese poker that may include a virtual player in place of one or more actual players. Actions of a virtual player may be controlled by a group of remote users rather than an actual player. A plurality of users may each take respective actions on behalf of the fourth player in a game and the game may be resolved for each of those players depending on the actions taken. One or more real players (e.g., three real players in some implementations) may play the game as normal players would while the virtual fourth player is controlled separately by the group of users. Accordingly, a virtual player variant may allow a group of players to play in a single game against a group of one or more real players. Such a variant may be particularly attractive when a group of celebrity players or high profile players play together as the real players and the virtual fourth player offers other users to play against the celebrity or high profile players. A system such as that of FIG. 1 may be used in some implementations to facilitate such a method. Such a method may include transmission to and/or receipt of data by one or more computing devices, calculation of scores, comparisons of hands, and so on by a computing device, and/or any desired action processed by any type of device as desired. FIG. 5 illustrates one example method that may be used in some embodiments.

As indicated at block 501, some embodiments may include determining a set of primary players in a game. Such primary players may include players that are the exclusive player for a spot in a game of Chinese poker. The players may be live players at a table, players at a virtual table hosted by an electronic gaming provider, and so on. Determining such players may include determining a group of celebrity, high roller, high profile or so on players. Such players may be sponsored or agree to play at some special event. Such players may be tournament winners (e.g., in some tournament of Chinese poker). such players may be determined in any manner such as a manner of matching players at block 301.

As indicated at block 503, some embodiments may include determining a set of users for a virtual fourth player position in the game. Such user may each play in a fourth spot of the game. The users may take actions in the game as they desire independently of the other users in the virtual fourth player position. Determining the set of user may include determining users that place a wager in the game through a user interface of a computing device. For example, users may be shown an interface that illustrates information about a game and allows the players to choose to place a wager on the virtual fourth player. In response to receiving a bet from a user, the user may be entered into a set of users for the virtual fourth player. A time period may be established before a game starts to allow such users to enter the game (e.g., five minutes before the start of a game, one minute before the start of a game, etc.). A bet may identify an amount of money that points involving a user will be worth. In some embodiments, each user may be required to have a same value for points. In some embodiments, each user may specify a value of points for a game. In some embodiments, some restriction may be placed on the value of points such as less than the value of points the players are playing against each other for, less than some amount set by a gaming operator, less than some amount set by a player, less than an amount so that a user is not able to loss more money than is in the user's account in the game, more than some minimum amount, and so on. In some embodiments, a user's points against all players may be the same or different based on the way a wagering system may allow wagering to occur (e.g., if the user is allowed to specify a single point value or point values for each player). Such point values may be stored in some data structure for access in resolving a game. Users' wagers may be against the players and not directly against other users in the game. A rake may be taken out of player play and/or user play by a gaming operator as payment for providing a service.

As indicated at block 505, some embodiments may include determining a respective set of cards for each player position in the game. Various examples of determining cards are given herein. Such cards may be virtual cards in an electronic environment and/or real cards in at a physical table. In a physical embodiment, a card reader of some sort may read cards for a virtual player position and the normal players may be given the physical cards. Each player may receive 13 cards as in a traditional game of Chinese poker. The cards may be given all at one time and/or in intervals. Some embodiment may include face up and/or face down cards in any combination as described elsewhere. Some embodiments may include betting rounds as desired. Some embodiments may not include additional betting rounds and may include all cards being dealt face down in a single interval as in traditional Chinese poker.

Each player may be presented with information identifying their cards. For example, real players may be given cards or shown cards through an interface depending on the implementation. Users playing as a fourth virtual player may be shown information identifying the cards dealt to the fourth player position (e.g., through a computing device interface). Information about cards dealt to each position may be determined by a gaming sever and/or received by the gaming server from some remote input device such as a card reader, a video camera, a manual input device, and so on.

As indicated at block 507, some embodiments may include facilitating setting of hands by real players in the game. For example, such setting may be similar to the setting described elsewhere for hands in Chinese poker. Real players may use an interface of a computing device to arrange their hands. Real players may place physical cards at a table to set their hands. Information may be received by a gaming server identifying such setting to be used to determining outcomes of the game in some embodiments (e.g., from a camera, from a mobile or other computing devices used y the players to play, from a manual input device used by an agent of a gaming operator to enter information, and so on).

As indicated at block 509, some embodiments may include facilitating setting of hands by each of the users in the group of users playing in the virtual fourth player position. Each user in the group of users may be presented with an interface through a respective computing device to allow the respective user to arrange the virtual fourth player's hand. Each user may select a different arrangement or a same arrangement as another user. Each user ma form any desired arrangement of cards into a set of hands. Such information may be received by a gaming server and used to determine outcomes of the game. In some embodiments, valid non-misset options may be determined by a gaming server and shown to the set of users. Each user may choose one of the options as their arrangement. In some embodiments, the group of cards available to the user for setting may be shown to the user and the user may be able to arrange the cards in any manner desired even if it is a misset option (e.g., by dragging cards around in a touch screen interface).

In some implementations, in response to determining a set of cards for the virtual fourth player, the users in the group of users playing as the virtual fourth player may be given some set amount of time in which to set their hands (e.g., 10 seconds, 30 seconds, 1 minute, 2 minutes, 5 minutes, etc.). If a user does not set his hands in that time, the user may be assigned a misset. This time limit may prevent the virtual fourth player from delaying the game by too much time. Some embodiments may include a similar time limit for the real players of the game. In some embodiments, a dealer or gaming server may track the progress of setting of the players and/or users and may facilitate a continuation of a game in response to setting being completed and/or a time period ending. For examples at the end of the time period, a dealer may be signaled by a light or other output mechanism that a game may continue because users are no longer setting their hands. The dealer may then cause a next part of a game to occur. In other embodiments, a computing device may cause a next part of a game to occur in response to a determination of a time period ending and/or players/users setting their hands.

As indicated at block 511, some embodiments may include scoring and/or facilitating payments based on set hands. For example, with respect to the real players in a game, the player hands may be resolved according to rules of Chinese poker (e.g., traditional rules, rules with betting rounds, etc.). With respect to the virtual fourth player, each user of the group of users may have his arrangement of hands evaluated against the hands of the real players. The users may then earn points and/or money as if each user was a real player in the fourth player position and had set his hands according to that specific user's manner of setting hands. Accordingly, each user may win or lose money as if they were in the fourth player position and had bet as they had when entering the game as a virtual fourth player. Various examples of scoring and facilitating payments are described elsewhere herein. In some embodiments, a gaming server may adjust a credit balance of one or more accounts according to the scoring of the various hands of the real players and sets offhand arrangements of the users in the group. In some embodiments physical money or credits may be provided to live players at a table in response to such scoring.

Some embodiments may include presenting information about the set of users and their various hand arrangements to the real players in the game. For example, an interface may be controlled to display information showing each chosen pattern of hands and the number of users that had arranged their hands in that pattern, a pic chart identifying the number of people in each arrangement, and/or any other desired presentation. In some embodiments, an amount of money won or lost and/or a number of points won or lost in total and/or by selected arrangement may be shown through such an interface to one or more real players.

For example, in one situation, a first player may have a three of a kind, a two pair, and a king high, a second player may have a two pair, a pair, and an ace high, a third player may have a straight, an ace high and a jack high. In such a situation, a first user may arrange a virtual fourth player's hand to include a two pair, a pair, and a queen high, a second user may arrange the same set of cards to include a full house, an ace high, and a queen high, and a third user may arrange the same set of cards to include an ace high, a pair, and a queen high. In the examples of scoring below, bonus points are ignored, but it should be recognized that some embodiments may include bonus points for, for example, naturals, sweeping, etc.

In such a situation, a first player may earn one point for each of hand one and hand two against the second player, and the second player may earn one point against player one for the third hand. Those points may be resolved for a cash value if the game is played for cash at an exchange rate agreed to between the first player and second player (e.g., at $100 per point, player two would owe player one $100). Each other player may similarly have hands and points evaluated against each other player.

In such a situation, each player may have his hands compared to each of the various user arrangements for virtual fourth player scoring. For example, a first player may earn a point for each hand against the first user. A first player may earn a point for a second and third hand from the second user, and the second user may earn a point for the first hand from the first player. A first player may earn a point for each hand from the third user because the third user misset his hands. Similar comparisons may be done for each of the three players with respect to the various users. Although each user was given the same cards in the same game to be played against the same players, they have resulted in different scores by playing those cards differently. Each point from a user may also have a different value that may depend on the bet amount by the player when the game begins. Each user may have his points evaluate to determine the amount of money due from or owed to that user to or from each player. In some situations, a user may play with points that are worth the same amount against each player, but that does not have to be the case. For example, a bet may indicate different points for different players, and/or an embodiment may include raises or point value changes that effect individual players.

Various values may be stored in a data structure to facilitate determining points between players and/or users. For example, a data structure may store hand arrangements for comparison by a computing device. A data structure may store dollar values of points so that points may be converted into dollars. A data structure may store the number of points each player has earned against each other player so that a point distribution may be determined. Any other information may be stored in such a data structure so that auditing of information and/or use of information may be achieved through such a data structure.

Some embodiments may include facilitating a change in an account balance of the players and/or users. For example, in response to a determination of points scored, the points may be converted into dollar values and then accounts may be adjusted according to those dollar values. Such accounts may be maintained by a gaming server and used to pale wagers by the users and/or players. Such accounts may be automatically adjusted in response to the outcome of the game being determined. In some embodiments, separate accounts may be used for users and players. For examples, players may play against each other with real money or from some separate account. Players and users may then compete with some electronic account and/or some account that is dedicated to virtual play. In other embodiments, a unified account may be used for players and users.

In some embodiments, a leader board or other statistics regarding users in the virtual fourth player slot may be determined. For example, over time, the users in the group of users may have their performance tracked (e.g., amount of wins, amount of points scored, amount of money won, etc.). Such tracked performance may present a wagering opportunity in some embodiments. For example, a user may wager on their or another user's performance in the leader board (e.g., that they will win the leader board at some time in the future). A tracked performance may be used to determine the outcome of such a wager. Some embodiments may include determining a winner of a leader board at some time period. For example, some embodiments may include real three players playing and a virtual fourth player option being presented for some number of hours in a day. A winner of a leaderboard may be determined after that period of time. The winner of the leader board may be given some prize, may be invited to play with the real players and/or take a place of one of the real players, and so on. Such information about winning or being offered the opportunity to be a real player in a game may be presented to the leader through a computing device interface. The player may for example then use such an interface to play a game such as in a real player position and/or perform any desired actions.

It should be recognized that FIG. 5 is given as a non-limiting example only and that other embodiments may include diffidently ordered action, different actions, more actions, fewer actions, and so on. For example, various methods described herein may be combined in any manner (e.g., a face up virtual fourth combination, a betting rounds in a virtual fourth game, users and/or players may be effected together or separately with such combinations, etc.).

It should be recognized that Chinese poker is given as a non-limiting example only. For example, other embodiments may include any game desired. Such a game may include a game where a player has to make a choice. It may be that the making of that choice is allowed to be done by the users in a virtual player position in that game similar to the way setting of hands is done in Chinese poker. For example, in a draw poker game, users playing a virtual player position may choose different cads to hold, in a blackjack game, users may choose how to play a virtual hand in different manners, similarly different choices may be made by users to play rounds of some variations of baccarat, poker, 3 card poker, pai gow, Texas hold em, Omaha, mahjong, pai gow poker, and so on. In some embodiments, a virtual player may be forced to be a last player in a game. For example, in games where different choices may impact the ordering of a source of card (e.g., such as number of cads to be drawn in blackjack) by allowing a virtual player to act before a real player, the users may each cause different numbers of cards to be requested and thereby have different effects on subsequent players. Accordingly, by forcing the virtual player to be a last player in the game, such subsequent deck effect may be eliminated.

XO VR Virtual Last Blackjack

Some embodiments may include a blackjack game with virtual last player elements. For example, a liv table game may be played by a set of players. Physical cards may be dealt to the players in accordance with the game rules. For a last player position or some other game area at the end of the local players play, a dealer may deal a series of cards. The number of cards may be equal to the number that may be needed in any event that may be taken by a virtual last player (e.g., any number of possible hits, any number of possible splits and then actions, etc.). These cards may be used to resolve play by any number of virtual last players in the game.

Some embodiments may include determining the values of cards dealt for a virtual last player in the game. For example, data indicating the card values may be received. The data may include video data, rfid data, pictures of the cars, an identity of the cards, and so on. For example, a card shoe may rad the cards, a table may read an rfid of the cards, a video camera may record the cards, and so on. Data may be received from such a reading device by a gaming server for use in determining the outcomes of the virtual last players in the game.

Some embodiments may include determining actions taken by a plurality of virtual players in the game. For example, in a blackjack game, virtual last players may be shown a first two cards that were desalt in the set of cards. Each virtual last player may make any number of legal choices in the game based on those cards (e.g., double down, hit some number of times, stand, split, etc.). A gaming server may transmit information about the two cards to device interfaces for display. The device interfaces may receive input from the users and transmit that input identifying actions back to the gaming serve.

Some embodiments may include resolving games based on the actions taken and the set of cards dealt. For example, a gaming server may determine how to assign cards to each virtual hand in response to the actions taken and the sequence of cads in the set. If a hit occurs in a virtual hand, a third card in the set may be shown to the virtual player that hit. If a stand occurs, then only the first two cards may be shown. The set of cards dealt may be treated as a deck from which cards may be dealt to the virtual hand.

In some embodiments, to eliminate cheating possibilities, the cards may be dealt in time intervals, so that actions must be locked in before the next cards are dealt. A dealer may be notified that when to take an action to coordinate timing. In some embodiments, to eliminate cheating, cards may be dealt face down so that no one can see them but they may still be readable by rfid or a show reader.

In some embodiments, extra odds bets may be offered to virtual players. Such bets may include side bets on the game (e.g., if a card will occur, if a hand event occurs, etc.). Such bets may occur after initial cards have been dealt in the game. Such a bet may have its odds determined based on the previously dealt cards so that the odds reflect the current state of the game and maintain some desired house edge.

Some embodiments may include presenting information about cards in the virtual game to players. For example, through a mobile interface, a graphical representation of the cards may be shown to the players. A graphical representation may include some animated display of the cards. For example, a gaming server may determine the value of the card based on the physical cards dealt and may transmit that information to the mobile device. The mobile device may then cause a virtual representation of that card to be displayed in the mobile device. An actual video display may be transmitted to the mobile device on request or instead of the virtual representation in some embodiments.

Based on the play of each virtual player, each virtual player may win or lose the game similar to live players according to the rule of the game being played.

The following sections provide a guide to interpreting the present application.

II. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of" each of the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

III. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

IV. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

V. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

VI. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth□, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VII. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VIII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

IX. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase “does not include” or by the phrase “cannot perform”.

X. Incorporation By Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

XI. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XII. Cards

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card, and may be referred to as picture cards. Other types of playing cards are described herein, but it should be recognized that various topics may apply to any, some, and/or all type of playing cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his “hand” he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

XIII. Rules of Card Games

Rules of Poker

In a basic poker game, which is played with a standard 52-card deck, each player is dealt five cards. All five cards in each player's hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player's hand. Regardless of the number of cards in a player's hand, the values assigned to the cards, and the odds, the method of evaluating all five cards in a player's hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a 'dealer' button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate number of cards are dealt to the players one at a time. Cards may be dealt either face-up or face-down, depending on the variant of poker being played. After the initial deal, the first of what may be several betting rounds begins. Between rounds, the players' hands develop in some way, often by being dealt additional cards or replacing cards previously dealt. At the end of each round, all bets are gathered into the central pot.

At any time during a betting round, if a player makes a bet, opponents are required to fold, call or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw Poker

Players each receive five—as in five-card draw—or more cards, all of which are hidden. They can then replace one or more of these cards a certain number of times.

Stud Poker

Players receive cards one at a time, some being displayed to other players at the table. The key difference between stud and 'draw' poker is that players are not allowed to discard or replace any cards.

Community Card Poker

Players combine individually dealt cards with a number of "community cards" dealt face up and shared by all players. Two or four individual cards may be dealt in the most popular variations, Texas hold 'em and Omaha hold 'em, respectively.

Poker Hand Rankings

Straight Flush

A straight flush is a poker hand such as Q♠ J♠ 10♠ 9♠ 8♠, which contains five cards in sequence, all of the same suit. Two such hands are compared by their high card in the same way as are straights. The low ace rule also applies: 5♦ 4♦ 3♦ 2♦ A♦ is a 5-high straight flush (also known as a "steel wheel"). An ace-high straight flush such as A♣ K♣ Q♣ J♣ 10♣ is known as a royal flush, and is the highest ranking standard poker hand (excluding five of a kind).

Examples

7♥ 6♥ 5♥ 4♥ 3♥ beats 5♠ 4♠ 3♠ 2♠ A♠

J♣ 10♣ 9♣ 8♣ 7♣ ties J♦ 10♦ 9♦ 8♦ 7♦

Four of a Kind

Four of a kind, or quads, is a poker hand such as 9♣ 9♠ 9♦ 9♥ J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

Examples

10♣ 10♦ 10♥ 10♠ 5♦ ("four tens" or "quad tens") defeats 6♦ 6♥ 6♠ 6♣ K♠ ("four sixes" or "quad sixes")

10♣ 10♦ 10♥ 10♠ Q♣ ("four tens, queen kicker") defeats 10♣ 10♦ 10♥ 10♠ 5♦ ("four tens with a five")

Full House

A full house, also known as a boat or a full boat, is a poker hand such as 3♣ 3♠ 3♦ 6♣ 6♥, which contains three matching cards of one rank, plus two matching cards of another rank. It ranks below a four of a kind and above a flush. Between two full houses, the one with the higher ranking set of three wins. If two have the same set of three (possible in wild card and community card games), the hand with the higher pair wins. Full houses are described by the three of a kind (e.g. Q-Q-Q) and pair (e.g. 9-9), as in "Queens over nines" (also used to describe a two pair), "Queens full of nines" or simply "Queens full".

Examples

10♠ 10♥ 10♦ 4♠ 4♦ ("tens full") defeats 9♥ 9♣ 9♠ A♥ A♣ ("nines full")

K♠ K♣ K♥ 3♦ 3♠ ("kings full") defeats 3♠ 3♥ 3♦ K♠ K♦ ("threes full")

Q♥ Q♦ Q♣ 8♥ 8♣ ("queens full of eights") defeats Q♥ Q♦ Q♣ 5♠ 5♥ ("queens full of fives")

Flush

A flush is a poker hand such as Q♣ 10♣ 7♣ 6♣ 4♣, which contains five cards of the same suit, not in rank sequence. It ranks above a straight and below a full house. Two flushes are compared as if they were high card hands. In other words, the highest ranking card of each is compared to determine the winner; if both have the same high card, then the second-highest ranking card is compared, etc. The suits have no value: two flushes with the same five ranks of cards are tied. Flushes are described by the highest card, as in "queen-high flush".

Examples

A♥ Q♥ 10♥ 5♥ 3♥ ("ace-high flush") defeats K♠ Q♠ J♠ 9♠ 6♠ ("king-high flush")

A♦ K♦ 7♦ 6♦ 2♦ ("flush, ace-king high") defeats A♥ Q♥ 10♥ 5♥ 3♥ ("flush, ace-queen high")

Q♥ 10♥ 9♥ 5♥ 2♥ ("heart flush") ties Q♠ 10♠ 9♠ 5♠ 2♠ ("spade flush")

Straight

A straight is a poker hand such as Q♣ J♠ 10♠ 9♥ 8♥, which contains five cards of sequential rank, of varying suits. It ranks above three of a kind and below a flush. Two straights are ranked by comparing the high card of each. Two straights with the same high card are of equal value, and split any winnings (straights are the most commonly tied hands in poker, especially in community card games). Straights are described by the highest card, as in "queen-high straight" or "straight to the queen".

A hand such as A♣ K♣ Q♦ J♠ 10♠ is an ace-high straight, and ranks above a king-high straight such as K♥ Q♠ J♥ 10♥ 9♦. But the ace may also be played as a 1-spot in a hand such as 5♠ 4♦ 3♦ 2♠ A♣, called a wheel or five-high straight, which ranks below the six-high straight 6♠ 5♣ 4♣ 3♥ 2♥. The ace may not "wrap around", or play both high and low in the same hand: 3♣ 2♦ A♠ K♠ Q♣ is not a straight, but just ace-high no pair.

Examples

8♠ 7♠ 6♥ 5♥ 4♠ ("eight-high straight") defeats 6♦ 5♠ 4♦ 3♥ 2♣ ("six-high straight")

8♠ 7♠ 6♥ 5♥ 4♠ ties 8♥ 7♦ 6♣ 5♣ 4♥

Three of a Kind

Three of a kind, also called trips, set or a prile, is a poker hand such as 2♦ 2♠ 2♥ K♠ 6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

Examples

8♠ 8♥ 8♦ 5♠ 3♣ ("three eights") defeats 5♣ 5♥ 5♦ Q♦ 10♣ ("three fives")

8♠ 8♥ 8♦ A♣ 2♦ ("three eights, ace kicker") defeats 8♠ 8♥ 8♦ 5♠ 3♣ ("three eights, five kicker")

Two Pair

A poker hand such as J♥ J♣ 4♣ 4♠ 9♠, which contains two cards of the same rank, plus two cards of another rank (that match each other but not the first pair), plus one unmatched card, is called two pair. It ranks above one pair and below three of a kind. Between two hands containing two pair, the higher ranking pair of each is first compared, and the higher pair wins. If both have the same top pair, then the second pair of each is compared. Finally, if both hands have the same two pairs, the kicker determines the winner. Two pair are described by the higher pair (e.g., K♥ K♣) and the lower pair (e.g., 9♠ 9♦), as in "Kings over nines", "Kings and nines" or simply "Kings up".

Examples

K♥ K♦ 2♣ 2♦ J♥ ("kings up") defeats J♦ J♠ 10♠ 10♣ 9♠ ("jacks up")

9♣ 9♦ 7♦ 7♠ 6♥ ("nines and sevens") defeats 9♥ 9♠ 5♥ 5♦ K♣ ("nines and fives")

4♠ 4♣ 3♠ 3♥ K♦ ("fours and threes, king kicker") defeats 4♥ 4♦ 3♦ 3 10♠ ("fours and threes with a ten")

One Pair

One pair is a poker hand such as 4♥ 4♠ K♠ 10♦ 5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

Examples

10♣ 10♠ 6♠ 4♥ 2♥ ("pair of tens") defeats 9♥ 9♣ A♥ Q♦ 10♦ ("pair of nines")

10♥ 10♦ J♦ 3♥ 2♣ ("tens with jack kicker") defeats 10♣ 10♠ 6♠ 4♥ 2♥ ("tens with six kicker")

2♦ 2♥ 8♠ 5♣ 4♣ ("deuces, eight-five-four") defeats 2♣ 2♠ 8♣ 5♥ 3♥ ("deuces, eight-five-three")

High Card

A high-card or no-pair hand is a poker hand such as K♥ J♣ 8♣ 7♦ 3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest ranking card; if those are equal, then the next highest ranking card; if those are equal, then the third highest ranking card, etc. No-pair hands are described by the one or two highest cards in the hand, such as "king high" or "ace-queen high", or by as many cards as are necessary to break a tie.

Examples

A♦ 10♦ 9♠ 5♣ 4♣ ("ace high") defeats K♣ Q♦ J♣ 8♥ 7♥ ("king high")

A♣ Q♣ 7♦ 5♥ 2♣ ("ace-queen") defeats A♦ 10♦ 9♠ 5♣ 4♣ ("ace-ten")

7♠ 6♣ 5♣ 4♦ 2♥ ("seven-six-five-four") defeats 7♣ 6♦ 5♦ 3♥ 2♣ ("seven-six-five-three")

Decks Using a Bug

The use of joker as a bug creates a slight variation of game play. When a joker is introduced in standard poker games it functions as a fifth ace, or can be used as a flush or straight card (though it can be used as a wild card too). Normally casino draw poker variants use a joker, and thus the best possible hand is five of a kind, as in A♥ A♦ A♣ A♠ Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that must qualify. As the dealer's hand is partially concealed during play (usually only one card, at most) is displayed to the player before player wagering is complete), the player must always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added. To "hit" is to take another card. To "stand" is to take no more cards. To "double down" is to double the wager, take precisely one more card and then "stand." When a player has identical value cards, such as a pair of 8s, the player can "split" by placing an additional wager and playing each card as the first card in two new hands. To "surrender" is to forfeit half the player's bet and give up his hand. "Surrender" is not an option in most casino games of Blackjack. A player's turn ends if he "stands," "busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer must hit until he has a point total of at least 17, regardless of what the players have. In most casinos, the dealer must also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling-down is only permitted for certain card combinations.

Insurance

Insurance is a commonly-offered betting option in which the player can hedge his bet by wagering that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealer's turn, the player wins his original $10 bet, making a net profit of $5. In the same situation, if the dealer's hole card is not one with a value of ten, again the player will immediately lose their $5 Insurance bet, and if the dealer's hand has a total value greater than the player's at the end of both of their turns, for example the player stood on 19 and the dealer ended his turn with 20, the player loses both his original $10 bet and his $5 Insurance bet.

Basic Strategy

Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the player's point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a "natural" pays less than 3:2 (e.g., Las Vegas Strip single-deck Blackjack paying out at 6:5 for a "natural"); if a hand can only be split once (is re-splitting possible for other than aces); if doubling down is restricted to certain totals (e.g., 9 11 or 10 11); if Aces may not be re-split; if the rules are those of "no-peek" (or European) Blackjack, according to which the player loses hands that have been split or "doubled down" to a dealer who has a "natural" (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player's advantage (because the dealer wins even money when the dealer has a natural, while the player wins at odds of 3:2 when the player has a natural). If the remaining cards have an elevated proportion of low-value cards, such as 4s, 5s and 6s, the player is more likely to bust, which is to the dealer's advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer's up card is a 10, but if the player knows that the deck has a disproportionately small number of low-value cards remaining, the odds may be altered in favor of standing on the 16.

There are a number of card-counting schemes, all dependent for their efficacy on the player's ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

XIV. Casino Countermeasures

Some methods of thwarting card counters include using a large number of decks. Shoes containing 6 or 8 decks are common. The more cards there are, the less variation there is in the proportions of the remaining cards and the harder it is to count them. The player's advantage can also be reduced by shuffling the cards more frequently, but this reduces the amount of time that can be devoting to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

XV. Video Wagering Games

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

XVI. Apparatus for Playing Over a Communications System

In some embodiments, there is a plurality of player units 40-1 to **40-*n* which are coupled via a communication system 41, such as the Internet, with a game playing system comprising an administration unit 42, a player register 43, and a game unit 45. Each unit 40** is typically a personal computer with a display unit and control means (a keyboard and a mouse).

When a player logs on to the game playing system, their unit 40 identifies itself to the administration unit. The system holds the details of the players in the register 43, which contains separate player register units 44-1 to 44-*n* for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40, and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

XVII. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

XVIII. References

The following patents and patent applications are hereby incorporated by reference herein for all purposes: U.S. Pat. Nos. 6,579,181, 6,299,536, 6,093,103, 5,941,769, 7,114,718, U.S. patent application Ser. No. 10/622,321, U.S. Pat. Nos. 4,515,367, 5,000,453, 7,137,630, and 7,137,629.

What is claimed is:

1. A method comprising:

controlling, by at least one processor:

determining a set of primary players for a live game played at a gaming table including at least one sensor and at least one display device;

determining a set of users for a virtual player in the live game, in which the set of users includes a plurality of users;

receiving, over a communication network, a separate monetary wager for each user of the set of users;

receiving, from the at least one sensor, information identifying a separate and respective set of cards for each primary player of the set of primary players for the live game;

receiving, from the at least one sensor, information identifying a second set of cards for the virtual player in the live game;

displaying, over the communication network, on a separate and respective user interface of a separate and respective remote device of each user of the set of users, the information identifying the second set of cards and options available in the live game, in which at least one user interface of the separate and respective user interfaces is configured to allow operation thereat to drag cards;

receiving a respective choice from each primary player of the set of primary players in the live game regarding play of the live game using a respective set of cards;

in response to receiving the information identifying the separate and respective set of cards for each primary player of the set of primary players and the respective choice from each primary player of the set of primary players, populating a data structure with respective ending values for the live game for each primary player of the set of primary players;

receiving, over the communication network, a respective second choice from each user of the set of users regarding play of the live game using the second set of cards;

in response to receiving the information identifying the second set of cards and the respective second choice from each user of the set of users, populating the data structure with respective second ending values for the live game for each user of the set of users;

displaying, over the communication network, respective user interfaces of remote devices of each user of the set of users with information identifying the respective ending values;

scoring the live game separately for each user of the set of users so that scoring is performed for each user of the set of users by comparing a single respective second ending value for a respective user of the set of users with all of the respective ending values for all of the primary players of the set of primary players;

displaying on the at least one display device an indication of the respective second ending values;

displaying, over the communication network, performance statistics for each user of the set of users on the separate and respective user interfaces;

receiving, over the communication network, a wager entered at a given user interface, from a given user of the set of users, on a performance of the given user or on a performance of another given user in the set of users;

determining a winner as a given user among the set of users based on the performance statistics; and displaying, over the communication network, on a user interface of a remote device of the given user, a data structure with an option to play as a primary player with the set of primary players or take a place of a given player of the set of primary players.

2. The method of claim 1, in which the respective choice from each primary player of the set of primary players includes a choice on how to set cards in a game of Chinese poker.

3. The method of claim 1, in which receiving the respective second choice from each user of the set of users includes a choice on how to set the second set of cards in a game of Chinese poker.

4. The method of claim 3, in which scoring the live game includes comparing the second set of cards set according to each respective second choice to each of the respective set of cards set according to a corresponding respective choice by a respective primary player of the set of primary players.

5. The method of claim 1, in which a given primary player of the set of primary players includes a player that solely controls a position in the live game and in which the virtual player includes a player that is controlled by the set of users in divergent directions.

6. The method of claim 1, in which the live game includes a four player game of Chinese poker and the set of primary players includes three real players and the virtual player includes a virtual fourth player in the four player game of Chinese poker.

7. An method comprising:

controlling, by at least one processor:

determining a set of first players for a game of Chinese poker played at ae gaming table including at least one sensor and at least one display device;

receiving, from the at least one sensor, first information identifying a respective and separate first interval of cards dealt to each first player of the set of first players;

determining first results from a first round of betting in the game of Chinese poker after receiving the first information;

receiving, from the at least one sensor, second information identifying a respective and separate second interval of cards dealt to each first player of the set of first players that remains in the game of Chinese poker after the first round of betting;

determining second results from a second round of betting in the game of Chinese poker after receiving the second information;

receiving, from the at least one sensor, third information identifying a respective and separate final interval of cards dealt to each first player of the set of first players that remains in the game of Chinese poker after the second round of betting;

determining third results from a final round of betting in the game of Chinese poker after receiving the third information;

receiving, for each first player of the set of first players that remains in the game of Chinese poker after the final round of betting, a respective group of three hands for the game of Chinese poker;

in response to receiving the respective groups of three hands for the game of Chinese poker for each first player of the set of first players that remains in the game of Chinese poker, populating a data structure with respective ending values for the game of Chinese poker for each first player of the set of first players that remains in the game of Chinese poker;

determining a set of users for a virtual player position in the game of Chinese poker, in which the set of users includes a plurality of users;

receiving, over a communication network, a separate monetary wager for each user of the set of users;

receiving, from the at least one sensor, fourth information identifying a set of cards for the virtual player position in the game of Chinese poker;

displaying, over the communication network, at respective user interfaces of remote devices of each user of the set of users, the fourth information identifying the set of cards and options available in the game of Chinese poker, in which at least one user interface of the respective user interfaces is configured to allow operation thereat to drag cards;

receiving, over the communication network, a plurality of respective and separate settings of the set of cards from each user of the set of users;

in response to receiving the fourth information identifying the set of cards and the plurality of respective and separate settings from each user of the set of users, populating the data structure with respective second ending values for the game of Chinese poker for each user of the set of users;

displaying, over the communication network, at respective user interfaces of remote devices of each user of the set of users, fifth information identifying the respective ending values for the game of Chinese poker for each first player of the set of first players that remains in the game of Chinese poker;

scoring the hands of Chinese poker according to rules of Chinese poker by comparing the respective ending values in the data structure for each first player of the set of first players that remains in the game of Chinese poker with respective ones of the respective second ending values in the data structure for each user of the set of users;

displaying at the at least one display device an indication of the respective second ending values;

displaying, over the communication network, performance statistics for each user of the set of users on the respective user interfaces;

receiving, over the communication network, a wager entered at a given user interface, from a given user of the set of users, on a performance of the given user or on a performance of another given user in the set of users;

determining a winner as a given user among the set of users based on the performance statistics; and displaying, over the communication network, on a user interface of a remote device of the given user, a data structure with an option to play as a first player with the set of first players or take a place of a given player of the set of first players.

8. The method of claim 1, in which the at least one sensor includes at least one of a camera, a card shoe, or an RFID sensor.

9. The method of claim 7, in which the at least one sensor includes at least one of a camera, a card shoe, or an RFID sensor.

* * * * *